(12) United States Patent
Takahata

(10) Patent No.: US 9,240,701 B2
(45) Date of Patent: Jan. 19, 2016

(54) LITHIUM-ION SECONDARY BATTERY

(75) Inventor: Koji Takahata, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 217 days.

(21) Appl. No.: 14/124,037

(22) PCT Filed: Jun. 8, 2011

(86) PCT No.: PCT/JP2011/063183
§ 371 (c)(1),
(2), (4) Date: Dec. 5, 2013

(87) PCT Pub. No.: WO2012/169030
PCT Pub. Date: Dec. 13, 2012

(65) Prior Publication Data
US 2014/0117940 A1    May 1, 2014

(51) Int. Cl.
| | | |
|---|---|---|
| *H02J 7/00* | (2006.01) | |
| *H01M 4/13* | (2010.01) | |
| *H01M 10/0566* | (2010.01) | |
| *H01M 10/04* | (2006.01) | |
| *H01M 10/0525* | (2010.01) | |
| *H01M 10/0587* | (2010.01) | |
| *H01M 10/44* | (2006.01) | |
| *H01M 2/36* | (2006.01) | |
| *H01M 4/02* | (2006.01) | |

(52) U.S. Cl.
CPC ............. *H02J 7/007* (2013.01); *H01M 4/13* (2013.01); *H01M 10/0431* (2013.01); *H01M 10/0525* (2013.01); *H01M 10/0566* (2013.01); *H01M 10/0587* (2013.01); *H01M 10/44* (2013.01); *H01M 2/36* (2013.01); *H01M 2004/021* (2013.01); *H01M 2300/0025* (2013.01); *Y02E 60/122* (2013.01)

(58) Field of Classification Search
CPC .............. H02J 7/0031; H02J 2007/004; H02J 2007/0037; Y02E 60/12; H01M 10/48
USPC ............................................. 320/134
See application file for complete search history.

(56) References Cited

U.S. PATENT DOCUMENTS

| | | | |
|---|---|---|---|
| 6,902,848 | B1 | 6/2005 | Izuchi et al. |
| 8,018,203 | B2 * | 9/2011 | Nishi .................. B60K 6/365 320/124 |
| 2005/0158623 | A1 | 7/2005 | Matsui et al. |
| 2008/0118833 | A1 * | 5/2008 | Ueda .................. H01M 4/131 429/209 |
| 2008/0241701 | A1 | 10/2008 | Okumura et al. |
| 2009/0029257 | A1 * | 1/2009 | Ando .................. H01G 9/016 429/231.95 |
| 2010/0090650 | A1 * | 4/2010 | Yazami ............... H01M 10/443 320/132 |
| 2011/0143181 | A1 * | 6/2011 | Ahn .................... H01M 2/1653 429/144 |
| 2012/0088129 | A1 * | 4/2012 | Kaneda ............... H01M 4/131 429/59 |

FOREIGN PATENT DOCUMENTS

| | | |
|---|---|---|
| JP | 5-144469 | 6/1993 |
| JP | 7-288139 | 10/1995 |
| JP | 2000-3723 | 1/2000 |
| JP | 2001-93573 | 4/2001 |
| JP | 2004-296305 | 10/2004 |
| JP | 2005-229103 | 8/2005 |
| JP | 2009-123671 | 6/2009 |

* cited by examiner

*Primary Examiner* — Arun Williams
(74) *Attorney, Agent, or Firm* — Finnegan, Henderson, Farabow, Garett & Dunner, LLP

(57) ABSTRACT

A lithium-ion secondary battery (100) includes a positive electrode mixture layer (223) coated on a positive electrode current collector (221), a negative electrode mixture layer (243) coated on a negative electrode current collector (241), and an electrolyte solution containing lithium ions at a predetermined concentration. The number of lithium ions X in the electrolyte solution impregnated per 1 $cm^3$ of the positive electrode mixture layer (223) and the number of lithium ions Y in the electrolyte solution impregnated per 1 $cm^3$ of the negative electrode mixture layer (243) are both $3.75 \times 10^{19}$ or greater.

7 Claims, 12 Drawing Sheets

LITHIUM-ION SECONDARY BATTERY

CROSS-REFERENCE TO RELATED APPLICATIONS

This application is a national phase application of International Application No. PCT/JP2011/063183, filed Jun. 8, 2011, the content of which is incorporated herein by reference.

TECHNICAL FIELD

The present invention relates to lithium-ion secondary batteries.

In the present description herein, the term "secondary battery" refers to a repeatedly chargeable storage device in general, and it is a term that encompasses what is called storage batteries, such as lithium-ion secondary batteries, nickel-metal hydride (Ni-MH) batteries, and nickel-cadmium (Ni—Cd) rechargeable batteries, as well as electrical storage elements such as electric double-layer capacitors.

In the present description, the term "lithium ion secondary battery" refers to a secondary battery in Which lithium ions are used as electrolyte ions and charging and discharging are implemented by the transfer of electrons accompanying lithium ions between positive and negative electrodes. The battery commonly referred to as "lithium secondary battery" is a typical example encompassed by the lithium-ion secondary battery of the present description.

BACKGROUND ART

For example, Patent Literature 1 below discloses "a lithium secondary battery employing a carbon material as a negative electrode support material and, as an electrolyte solution, an organic electrolyte solution in which a lithium salt as an electrolyte is dissolved in an organic solvent". Patent Literature 1 discloses that "the amount of the lithium salt in the electrolyte solution is set at 0.5 millimoles or less per 1 gram of the carbon material". Other prior art documents about lithium secondary batteries include Patent Literatures 2 through 6, for example.

CITATION LIST

Patent Literature

Patent Literature 1: JP H07(1995)-288139 A
Patent Literature 2: JP 2001-91573 A
Patent Literature 3: JP H05(1993)-144469 A
Patent Literature 4: JP 2000-03723 A
Patent Literature 5: JP 2004-296305 A
Patent Literature 6: JP 2005-229103 A

SUMMARY OF INVENTION

Technical Problem

Lithium-ion secondary batteries tend to show a deterioration in output power characteristics, for example, under low temperature environments. The deterioration in output power characteristics at low temperature should be minimized particularly for the vehicle drive batteries to be equipped in the vehicles used in cold-climate regions.

Solution to Problem

A lithium-ion secondary battery comprises a positive electrode current collector, a positive electrode mixture layer, a negative electrode current collector, a negative electrode mixture layer, an electrolyte solution, and a battery case. The positive electrode mixture layer is coated on the positive electrode current collector, and contains at least a positive electrode active material and a conductive material. The negative electrode mixture layer is coated on the negative electrode current collector, and contains at least a negative electrode active material. The electrolyte solution contains lithium ions at a predetermined concentration. The positive electrode mixture layer has pores in which the electrolyte solution is impregnated. The negative, electrode mixture layer has pores in which the electrolyte solution is impregnated. In this lithium-ion secondary battery, the number of lithium ions X in the electrolyte solution impregnated per 1 $cm^3$ of the positive electrode mixture layer and the number of lithium ions Y in the electrolyte solution impregnated per 1 $cm^3$ of the negative electrode mixture layer are both $3.75 \times 10^{19}$ or greater. Here, the number of lithium ions X may be obtained by the following equation: X=(the volumetric capacity Vb of the pores in the positive electrode mixture layer per 1 $cm^3$ of the positive electrode mixture layer)×(the lithium ion concentration L (mol/L) of the electrolyte solution)×Avogadro's number (NA). The number of lithium ions Y may be obtained by the following equation: Y=(the volumetric capacity Vd of the pores in the negative electrode mixture layer per 1 $cm^3$ of the negative electrode mixture layer)×(the lithium ion concentration L (mol/L) of the electrolyte solution)×Avogadro's number (NA).

In such a lithium-ion secondary battery, an appropriate amount of lithium ions are contained in the positive electrode mixture layer. Therefore, the decrease in the output power at low temperatures can be inhibited.

It is possible that the number of lithium ions X and the number of lithium ions Y may be both greater than $7.00 \times 10^{20}$. As a result, the decrease in the output power at low temperatures can be inhibited further.

It is also possible that the value Y1 obtained by dividing the number of lithium ions Y by the weight (g) of the negative electrode active material contained per 1 $cm^3$ of the negative electrode mixture layer may be $43 \times 10^{14}$ or less. In this case, the capacity of the lithium-ion secondary battery 100 can be retained easily even in a temperature environment at, for example, about 60° C.

The positive electrode mixture layer may have a density A1 of less than or equal to 1.9 $g/cm^3$. The conductive material may have a bulk density A2 of less than or equal to 0.04 $g/cm^3$. The positive electrode mixture layer may have a weight ratio A3 of the conductive material to the positive electrode of 11% or less.

A power supply system includes a secondary battery, and a battery control unit electrically wherein the upper limit value W of the amount of consumed electric charge per unit time during discharge of the secondary battery is determined and connected to the secondary battery Here, the secondary battery includes a positive electrode current collector, a positive electrode mixture layer coated on the positive electrode current collector and containing at least a positive electrode active material and a conductive material, a negative electrode current collector, a negative electrode mixture layer coated on the negative electrode current collector and containing at least a negative electrode active material, and an electrolyte solution containing lithium ions at a predetermined concentration.

The positive electrode mixture layer has pores in which the electrolyte solution is impregnated, and the negative electrode mixture layer has pores in which the electrolyte solution is impregnated. The number of lithium ions X in the electrolyte solution impregnated per 1 cm³ of the positive electrode mixture layer and the number of lithium ions Y in the electrolyte solution impregnated per 1 cm³ of the negative electrode mixture layer are both equal to or greater than the number of consumed lithium ions Zx per 1 cm³ of the positive electrode mixture layer.

The number of lithium ions X may be obtained by the following equation: X=(the volumetric capacity Vb of the pores in the positive electrode mixture layer per 1 cm³ of the positive electrode mixture layer)×(the lithium ion concentration L (mol/L) of the electrolyte solution)×Avogadro's number (NA). The number of lithium ions Y may be obtained by the following equation: Y=(the volumetric capacity Vd of the pores in the negative electrode mixture layer per 1 cm³ of the negative electrode mixture layer)×(the lithium ion concentration L (mol/L) of the electrolyte solution)×Avogadro's number (NA). The number of consumed lithium ions Zx is obtained by the following equation: Zx={(the upper limit value W of the amount of consumed electric charge÷elementary charge)/the volume of the positive electrode mixture layer)}.

The secondary battery may be a battery module including a plurality of lithium-ion secondary batteries, and the number of consumed lithium ions Zx may be represented by the equation Zx={(the upper limit value W of the amount of consumed electric charge÷elementary charge)/(the total sum of the volumes of the positive electrode mixture layers 223 of the lithium-ion secondary batteries 100 in the battery module 1000)}.

In such a power supply system, appropriate amounts of lithium ions are ensured for the positive electrode mixture layer and the negative electrode mixture layer in each of the lithium-ion secondary batteries, within the range controlled by the battery control unit. Therefore, within the range controlled by the battery control unit, the resistance increase rate of each of the lithium-ion secondary batteries can be suppressed.

DESCRIPTION OF EMBODIMENTS

Hereinbelow a secondary battery according to one embodiment of the present invention will be described with reference to the drawings. The parts and components that exhibit the same workings are denoted by the same reference symbols as appropriate. The drawings are depicted schematically and do not necessarily reflect actual objects. Herein, an example of the structure of a lithium-ion secondary battery as an example of the secondary battery of the present invention will be described first, then, a positive electrode mixture layer and a negative electrode mixture layer of the lithium-ion secondary battery will be described, and further, an evaluation test for the lithium-ion secondary battery will be described.

Figure 1:
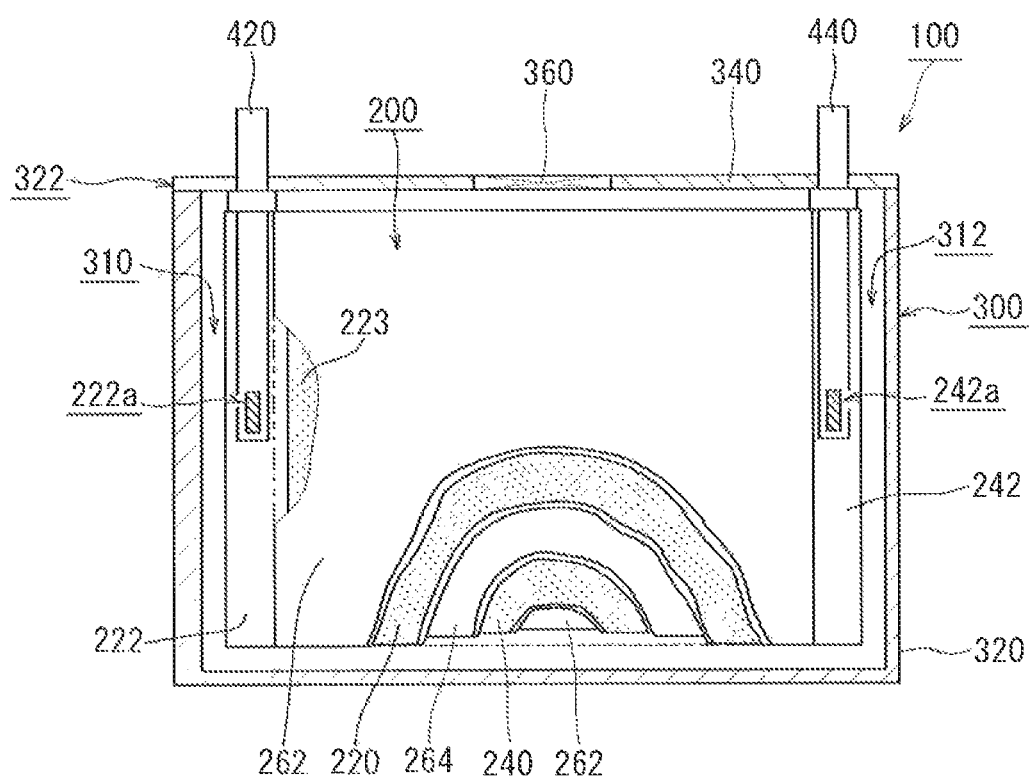
FIG. 1 is a view illustrating one example of the structure of a lithium-ion secondary battery.
Figure 2:
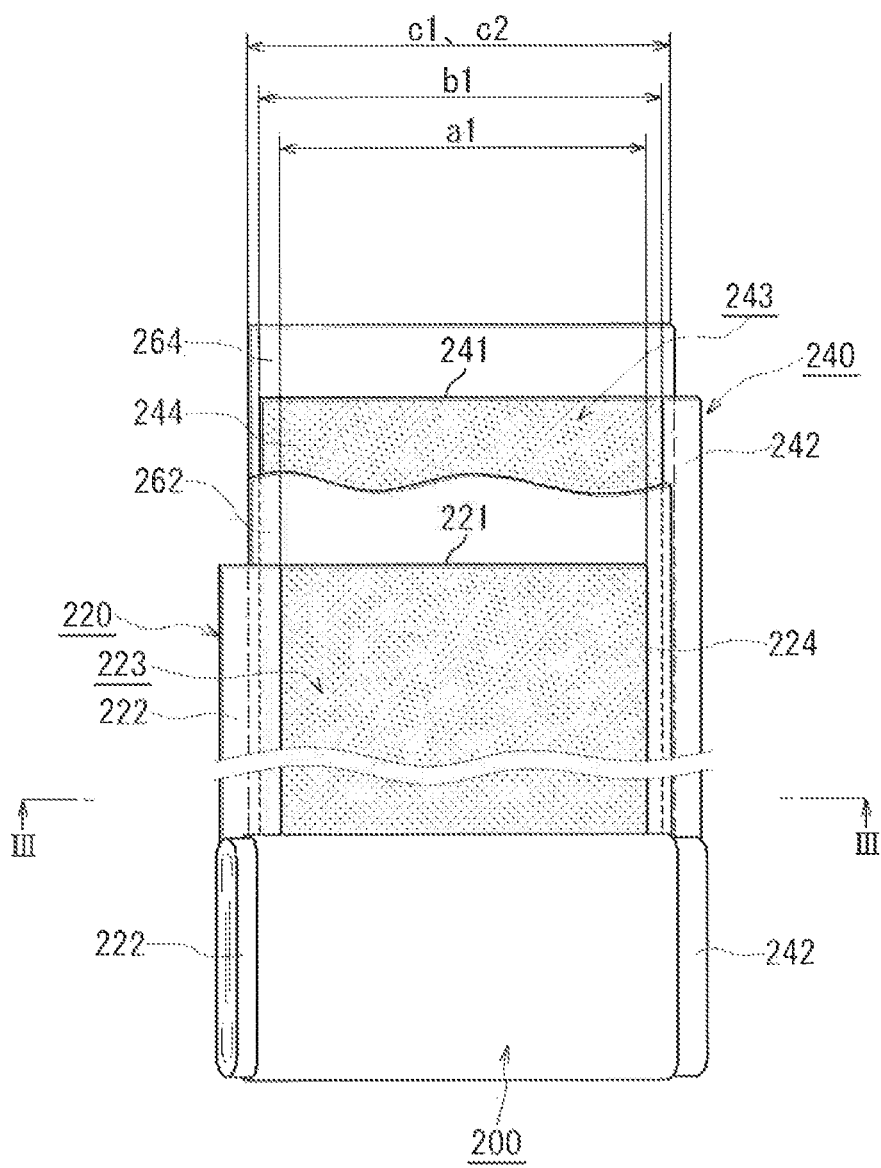
FIG. 2 is a view illustrating a wound electrode assembly of the lithium-ion secondary battery.
Figure 3:
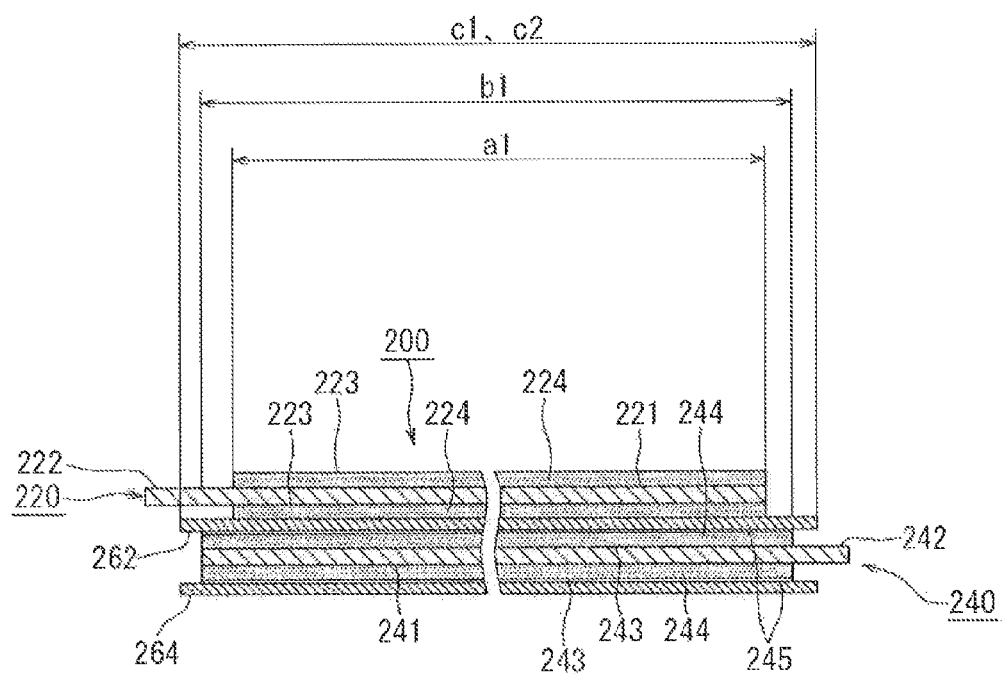
FIG. 3 shows a cross section taken along line III-III in FIG. 2.

FIG. 1 illustrates a lithium-ion secondary battery 100. As illustrated in FIG. 1, the lithium-ion secondary battery 100 has a wound electrode assembly 200 and a battery case 300. FIG. 2 is a view illustrating the wound electrode assembly 200. FIG. 3 shows a cross section taken along line III-III in FIG. 2.

As illustrated in FIG. 2, the wound electrode assembly 200 has a positive electrode sheet 220, a negative electrode sheet 240, and separators 262 and 264. The positive electrode sheet 220, the negative electrode sheet 240, and the separators 262 and 264 are strip-shaped sheets.

<<Positive Electrode Sheet 220>>

The positive electrode sheet 220 has a strip-shaped positive electrode current collector 221 (positive electrode core material), as illustrated in FIG. 2. A metal foil suitable for the positive electrode may be used preferably for the positive electrode current collector 221. A strip-shaped aluminum foil having a predetermined width is used for this positive electrode current collector 221. The positive electrode sheet 220 also has an uncoated portion 222 and a positive electrode mixture layer 223. The uncoated portion 222 is provided along one lateral-side edge of the positive electrode current collector 221. The positive electrode mixture layer 223 is a coating layer of a positive electrode mixture 224 containing a positive electrode active material. The positive electrode mixture 224 is coated on both faces of the positive electrode current collector 221 except the uncoated portion 222 provided in the positive electrode current collector 221.

<<Positive Electrode Mixture 224 and Positive Electrode Active Material>>

Here, the positive electrode mixture 224 is a mixture in which the positive electrode active material, a conductive material, a binder, and the like are mixed together. Various types of substances that can be used as the positive electrode active material of lithium-ion secondary batteries may be used for the positive electrode active material. Examples of the positive electrode active material include lithium transition metal oxides, such as $LiNiCoMnO_2$ (lithium-nickel-cobalt-manganese composite oxide), $LiNiO_2$ (lithium nickel oxide), $LiCoO_2$ (lithium cobalt oxide), $LiMn_2O_4$ (lithium manganese oxide), and $LiFePO_4$ (lithium iron phosphate). Here, $LiMn_2O_4$ may have, for example, a spinel structure. $LiNiO_2$ and $LiCoO_2$ may have a layered rock-salt structure. $LiFePO_4$ may have, for example, an olivine structure. The LiFePO$_4$ with an olivine structure may have, for example, particles in the range of nanometers. The LiFePO$_4$ with an olivine structure may further be coated with a carbon film.

<<Conductive Material>>

The positive electrode mixture 224 may contain any desired component such as a conductive material and a binder (binder agent) as necessary, in addition to the positive electrode active material. Examples of the conductive material include carbon materials, such as carbon powder and carbon fiber. It is possible to use one of the just-mentioned examples of the conductive materials either alone or in combination with another one or more of the examples. Examples of the carbon powder include various types of carbon blacks (such as acetylene black, oil-furnace black, graphitized carbon black, carbon black, graphite, and Ketjen Black) and graphite powder.

<<Binder, Thickening Agent, and Solvent>>

For the binder, it is possible to use polymers that can be dissolved or dispersed in the solvent used. Preferable examples of the polymers that can be used for the positive electrode mixture composition using an aqueous solvent may include water-soluble or water-dispersible polymers, including: cellulose-based polymers, such as carboxymethylcellulose (CMC) and hydroxypropyl methyl cellulose (HPMC) (for example, polyvinyl alcohol (PVA) and poly (PTFE)); fluoropolymers, such as tetrafluoroethylene-hexafluoropropylene copolymer (FEP) (for example, vinyl acetate copolymer and styrene-butadiene copolymer (SBR)); and rubber materials, such as acrylic acid-modified SBR resin (SBR latex). Preferable examples of the polymers that can be used for the positive electrode mixture composition using a non-aqueous solvent may include polyvinylidene fluoride (PVDF) and polyvinylidene chloride (PVDC). The just-mentioned examples of the polymer materials can be used for the purpose of obtaining the function as an addition agent, such as a thickening agent, for the above-described composition, in addition to the function as a binder. For the solvent, it is possible to use either an aqueous solvent or a non-aqueous solvent. A suitable example of the non-aqueous solvent is N-methyl-2-pyrrolidone (NMP).

It is preferable that the mass proportion of the positive electrode active material in the entire positive electrode mixture be about 50 mass % or more (typically from 50 mass % to 95 mass %), and generally more preferably from about 70 mass % to about 95 mass % (e.g., from 75 mass to 90 mass %). The proportion of the conductive material in the entire positive electrode mixture may be from about 2 mass % to about 20 mass %, generally preferably from about 2 mass % to about 15 mass %. In a composition that uses a binder, the proportion of the binder in the entire positive electrode mixture may be from about 1 mass % to about 10 mass generally preferably from about 2 mass % to about 5 mass %.

<<Negative Electrode Sheet 240>>

As illustrated in FIG. 2, the negative electrode sheet 240 has a strip-shaped negative electrode current collector 241 (negative electrode core material). A metal foil suitable for the negative electrode may be used preferably for the negative electrode current collector 241. In this embodiment, a strip-shaped copper foil having a predetermined width is used for the negative electrode current collector 241. The negative electrode sheet 240 includes an uncoated portion 242 and a negative electrode mixture layer 243. The uncoated portion 242 is provided along one lateral-side edge of the negative electrode current collector 241. The negative electrode mixture layer 243 is a coating layer of a negative electrode mixture 244 containing a negative electrode active material. The negative electrode mixture 244 is coated on both faces of the negative electrode current collector 241 except the uncoated portion 242 provided in the negative electrode current collector 241.

<<Negative Electrode Mixture 244>>

Here, the negative electrode mixture 244 is a mixture in which the negative electrode active material, a thickening agent, a binder, and the like are mixed together. Various types of substances that can be used as the negative electrode active material of lithium-ion secondary batteries may be used for the negative electrode active material. Examples of the negative electrode active material include: carbon-based materials such as natural graphite, artificial graphite, amorphous carbons of natural graphite and artificial graphite; lithium transition metal oxides; and lithium transition metal nitrides. Note that the negative electrode active material itself is electrically conductive. For this reason, a conductive material may be added to the negative electrode mixture 244 if necessary. In this example, as illustrated in FIG. 3, a heat-resistant layer 245 (HRL) is further formed on a surface of the negative electrode mixture layer 243. The heat-resistant layer 245 is mainly formed of a metal oxide (such as alumina). In this lithium-ion secondary battery 100, the heat-resistant layer 245 is formed on each surface of the negative electrode mixture layer 243. Although not shown in the drawings, the beat-resistant layer may be formed on the surfaces of the separators 262 and 264, for example.

<<Negative Electrode Active Material>>

Any of conventional materials used for lithium-ion secondary batteries, either alone or in combination, may be used for the negative electrode active material without any particular limitation. Examples include particulate carbon materials (carbon particles) at least partially containing a graphite structure (a layered structure). More specifically, examples include what is called graphitic materials (graphites), non-graphitizable carbons (hard carbons), graphitizable carbons (soft carbons), and combinations thereof. For example, it is possible to use graphite particles such as natural graphite. In addition, in order to maintain the dispersion of the negative electrode active material, an appropriate amount of thickening agent is mixed in the negative electrode mixture. For the negative electrode mixture, it is possible to use the thickening agent, the binder, and the conductive material that are the same as used for the positive electrode mixture.

Although not particularly limited, the proportion of the negative electrode active material in the entire negative electrode mixture may be set to about 80 mass % or greater (e.g., from 80 mass % to 99 mass %). It is preferable that the proportion of the negative electrode active material in the entire negative electrode mixture be about 90 mass % or greater (e.g., from 90 mass % to 99 mass %, and more preferably from 95 mass % to 99 mass %). In the composition that uses a binder, the proportion of the binder in the entire negative electrode mixture may be, for example, from about 0.5 mass % to about 10 mass %, generally preferably from about 1 mass % to 5 mass %. The positive electrode mixture layer 223 and the negative electrode mixture layer 243 are formed by coating the electrode mixtures on the positive electrode current collector 221 and the negative electrode current collector 241, drying them, and further pressure-rolling them.

In this embodiment, the manufacturing method of the lithium-ion secondary battery 100 includes a mixture preparing step, a coating step, a drying step, and a pressure-rolling step.

<<Mixture Preparing Step>>

The mixture preparing step is a step for preparing a mixture containing an active material. In this embodiment, for example, the above-described electrode active materials (the positive electrode active material and the negative electrode active material), the conductive material, the binder, the thickening agent, and so forth are mixed together in a solvent, to prepare the positive electrode mixture 224 and the negative electrode mixture 244. For example, an appropriate kneader (planetary mixer, Homodisper, Clearmix, Filmics, etc) is used for the operation of mixing (kneading) the electrode active materials, the conductive material, the binder, the thickening agent, and so forth in a solvent. To form the positive electrode mixture 224, first, the positive electrode active material, the conductive material, the binder, the thickening agent, and so forth may be mixed together (hard-kneaded) in a small amount of solvent, and thereafter, the obtained kneaded material may be diluted in an appropriate amount of solvent. Alternatively, a thickening agent solution in which a thickening agent is mixed in a solvent is prepared at first, and the positive electrode active material, the conductive material, and the binder may be mixed with the thickening agent solution.

<<Coating with Mixture>>

The coating step is a step for coating the mixture prepared in the mixture preparing step onto a current collector. In this embodiment, the positive electrode mixture 224 or the negative electrode mixture 244 is coated on a sheet-shaped current collector. For the coating step, it is possible to use a conventionally known appropriate coating apparatus, such as a slit coater, a die-coater, a comma coater, and a gravure coater. In this case, by using a long strip-like sheet-shaped current collector, the positive electrode mixture 224 or the negative electrode mixture 244 can be coated continuously on the current collector.

<<Drying Step>>

The drying step is a step for drying the mixture that has been coated on a current collector in the coating step. When drying the positive electrode mixture or the negative electrode mixture coated on a sheet-shaped current collector, appropriate dry conditions may be set in order to prevent migration. In this case, the positive electrode mixture 224 or the negative electrode mixture 244 coated on the current collector can be dried continuously by using a long strip-like sheet-shaped current collector and passing the current collector along the traveling path provided in a drying oven.

<<Pressure-Rolling Step>>

The pressure-rolling step is a step of pressure-rolling the mixture layer obtained in the drying step. In this embodiment, a sheet-shaped positive electrode (positive electrode sheet) with target properties can be obtained by pressing the positive electrode mixture layer 223 or the negative electrode mixture layer 243, which has been dried in the drying step, in a thickness direction. For the method of the pressing, it is possible to employ a conventionally known pressing technique, such as roll pressing and flat plate pressing, as appropriate.

<<Separators 262 and 264>>

Each of the separators 262 and 264 is a member for separating the positive electrode sheet 220 and the negative electrode sheet 240 from each other. In this example, each of the separators 262 and 264 is made of a strip-shaped sheet having a plurality of micropores and having a predetermined width. Examples of the separators 262 and 264 include, a single layer separator and a multi-layered separator, which are made of porous polyolefin-based resin. In this example, as illustrated in FIGS. 2 and 3, the width b1 of the negative electrode mixture layer 243 is slightly wider than the width a1 of the positive electrode mixture layer 223. In addition, the widths c1 and c2 of the separators 262 and 264 are slightly wider than the width hi of the negative electrode mixture layer 243 (c1, c2>b1>a1).

<<Wound Electrode Assembly 200>>

The positive electrode sheet 220 and the negative electrode sheet 240 of the wound electrode assembly 200 are stacked and wound with the separators 262 and 264 interposed therebetween.

As illustrated in FIG. 2, in this example, the positive electrode sheet 220, the negative electrode sheet 240, and the separators 262 and 264 are aligned in the same longitudinal direction and stacked in the following order: the positive electrode sheet 220, the separator 262, the negative electrode sheet 240, and the separator 264. At this time, the separators 262 and 264 are stacked over the positive electrode mixture layer 223 and the negative electrode mixture layer 243. The width of the negative electrode mixture layer 243 is slightly wider than the positive electrode mixture layer 223. The negative electrode mixture layer 243 is stacked over the positive electrode mixture layer 223. This allows lithium ions (Li) to transfer between the positive electrode mixture layer 223 and the negative electrode mixture layer 243 more reliably during charge and discharge.

Moreover, the positive electrode sheet 220 and the negative electrode sheet 240 are stacked so that the uncoated portion 222 of the positive electrode sheet 220 and the uncoated portion 242 of the negative electrode sheet 240 protrude in opposite lateral directions from the separators 262 and 264. The stacked Sheets (e.g., the positive electrode sheet 220) are wound around a winding axis set in a lateral direction.

In the wound electrode assembly 200, the positive electrode sheet 220, the negative electrode sheet 240, and the separators 262 and 264 are stacked on each other in a predetermined order and wound together. In this fabrication step, these sheets are stacked one on top of the other while controlling the respective positions of the sheets by a position adjusting mechanism, such as EPC (Edge Position Control). In this case, the negative electrode mixture layer 243 is stacked over the positive electrode mixture layer 223 so as to cover the positive electrode mixture layer 223 while the separators 262 and 264 are interposed therebetween.

<<Battery Case 300>>

In this example, as illustrated in FIG. 1, the battery case 300 is what is called a prismatic battery case, and it includes a case main body 320 and a lid 340. The case main body 320 has a closed-bottom quadrangular prismatic tubular shape, and is a flat-box-shaped case and whose one side face (upper face) is open. The lid 340 is a member that is attached to the opening of the case main body 320 the opening in the upper face thereof) to close the opening.

For an on-vehicle secondary battery, it is desired to improve the weight energy efficiency (the capacity of the battery per unit weight) in order to improve fuel consumption. For this reason, it is desired to employ a lightweight metal such as aluminum or an aluminum alloy (aluminum in this example) for the case main body 320 and the lid 340. Which constitute the battery case 300. Thereby, the weight energy efficiency can be improved.

The battery case 300 has a flat rectangular internal space as the space for accommodating the wound electrode assembly 200. As illustrated in FIG. 1, the flat internal space of the battery case 300 is slightly wider than the wound electrode assembly 200. In this embodiment, the wound electrode assembly 200 is accommodated in the internal space of the battery case 300. As illustrated in FIG. 1, the wound electrode assembly 200 is enclosed in the battery case 300 in such a manner that it is deformed into a flat shape in one direction perpendicular to the winding axis.

In this embodiment, the battery case 300 has the case main body in a closed-bottom quadrangular prismatic tubular shape and the lid 340 closing the opening of the case main body 340. The case main body 320 may be formed by, for example, deep drawing or impact molding. Note that the impact molding is one type of cold forging, and is also referred to as impact extrusion or impact pressing.

To the lid 340 of the battery case 300, electrode terminals 420 and 440 are attached. The electrode terminals 420 and 440 penetrate through the battery case 300 (the lid 340) and stick out outside the battery case 300. The lid 340 is provided with a safety vent 360.

In this example, the wound electrode assembly 200 is attached to the electrode terminals 420 and 440, which are attached to the battery case 300 (to the lid 340 in this example). The wound electrode assembly 200 is enclosed in the battery case 300 in such a manner that it is pressed into a flat shape in one direction perpendicular to the winding axis. In the wound electrode assembly 200, the uncoated portion 222 of the positive electrode sheet 220 and the uncoated portion 242 of the negative electrode sheet 240 protrude in opposite lateral directions from the separators 262 and 264. Of these, one electrode terminal 420 is fixed to the uncoated portion 222 of the positive electrode current collector 221, while the other electrode terminal 440 is fixed to the uncoated portion 242 of the negative electrode current collector 241.

Figure 4:
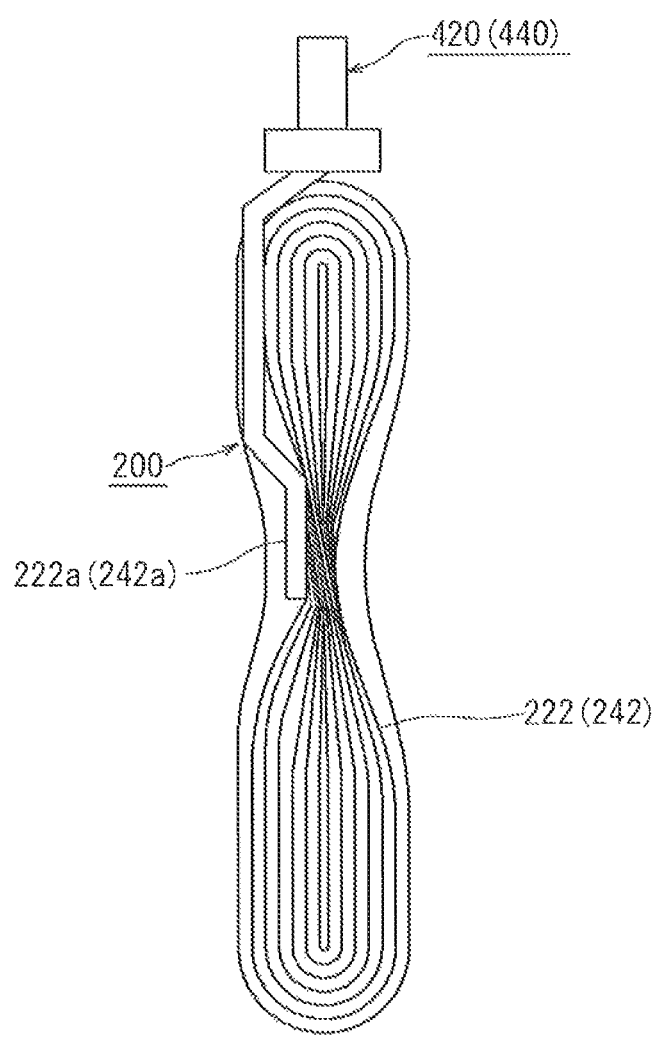
FIG. 4 is a side view illustrating a portion where an uncoated portion of the wound electrode assembly is welded to an electrode terminal.

In this example, as illustrated in FIG. 1, the electrode terminals 420 and 440 in the lid 340 extend to respective intermediate portions 222a and 242a of the uncoated portion 222 and the uncoated portion 242 of the wound electrode assembly 200. The foremost end portions of the electrode terminals 420 and 440 are welded to the respective intermediate portions of the uncoated portion 222 and the uncoated portion 242. FIG. 4 is a side view illustrating the portion where the uncoated portion 222 or 242 of the wound electrode assembly 200 is welded to the electrode terminal 420 or 440.

As illustrated in FIG. 4, the uncoated portion 222 of the positive electrode current collector 221 and the uncoated portion 242 of the negative electrode current collector 241 are exposed from the respective sides of the separators 262 and 264 in a spiral shape. In this embodiment, these uncoated portions 222 and 242 are gathered at their intermediate portions and are welded to the foremost end portions of the respective electrode terminals 420 and 440. In this case, from the viewpoint of the difference in materials, ultrasonic welding, for example, is used for welding the electrode terminal 420 to the positive electrode current collector 221. On the other hand, resistance welding, for example, is used for welding the electrode terminal 440 to the negative electrode current collector 241.

Thus, the wound electrode assembly 200 is attached to the electrode terminals 420 and 440 fixed to the lid 340 while it is pressed into a flat shape. The wound electrode assembly 200 is accommodated in the flat internal space of the case main body 320. The case main body 320 is closed by the lid 340 after the wound electrode assembly 200 is placed therein. A joint portion 322 (see FIG. 1) between the lid 340 and the case main body 320 is welded and sealed by, for example, laser welding. Thus, in this example, the wound electrode assembly 200 is positioned in the battery case 300 by the electrode terminals 420 and 440 fixed to the lid 340 (i.e., the battery case 300).

<<Electrolyte Solution>>

Thereafter, an electrolyte solution is filled into the battery case 300 through a filling port provided in the lid 340. The electrolyte solution used in this example is an electrolyte solution in which $LiPF_6$ is contained at a concentration of about 1 mol/L in a mixed solvent of ethylene carbonate and diethyl carbonate (e.g., a mixed solvent with a volume ratio of about 1:1). Thereafter, a metal sealing cap is attached (welded, for example) to the filling port to seal the battery case 300. For the electrolyte solution, any non-aqueous electrolyte solution that has conventionally been used for lithium-ion secondary batteries may be used.

<<Gas Release Passage>>

In this example, the flat internal space of the battery case 300 is slightly wider than the wound electrode assembly 200 deformed in a flat shape. Gaps 310 and 312 are provided between the wound electrode assembly 200 and the battery case 300 at the respective sides of the wound electrode assembly 200. Each of the gaps 310 and 312 serves as a gas release passage.

In the lithium-ion secondary battery 100 with such a configuration, the temperature rises when overcharge takes place. When the temperature of the lithium-ion secondary battery 100 rises, the electrolyte solution is decomposed, and consequently gas is generated. The generated gas can be smoothly discharged outside through the gaps 310 and 312 between the wound electrode assembly 200 and the battery case 300 at the opposite sides of the wound electrode assembly 200 and then through the safety vent 360. In the lithium-ion secondary battery 100, the positive electrode current collector 221 and the negative electrode current collector 241 of the wound electrode assembly 200 are electrically connected to an external device via the electrode terminals 420 and 440 penetrating through the battery case 300.

<<Other Battery Constructions>>

It should be noted that the foregoing merely shows one example of the lithium-ion secondary battery. The lithium-ion secondary battery is not limited to the foregoing embodiment. Likewise, the electrode sheet in which an electrode mixture is coated on a metal foil may be used in various other types of battery constructions. Cylindrical batteries and laminate-type batteries, for example, are known as other types of battery constructions. The cylindrical battery is a battery in which a wound electrode assembly is enclosed in a cylindrical battery case. The laminate-type battery is a battery in which positive electrode sheets and negative electrode sheets are stacked on each other with separators interposed therebetween.

Hereinbelow, the positive electrode mixture layer 223 and the negative electrode mixture layer 243 are described in further detail.

Figure 5:
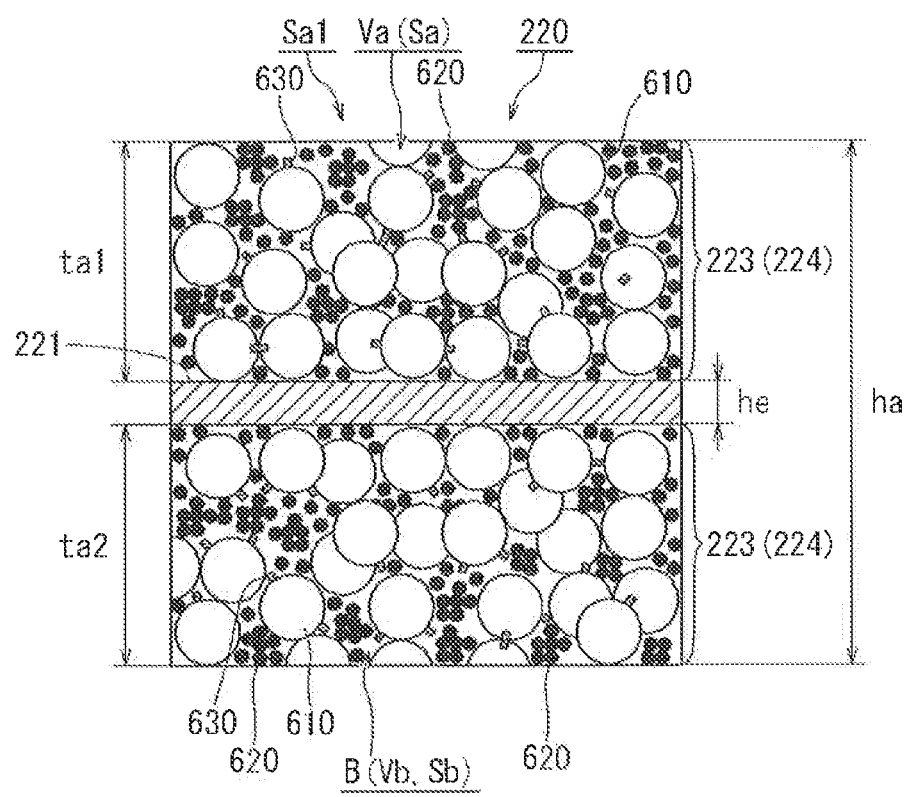
FIG. 5 is a cross-sectional view illustrating the structure of a positive electrode mixture layer.
Figure 6:
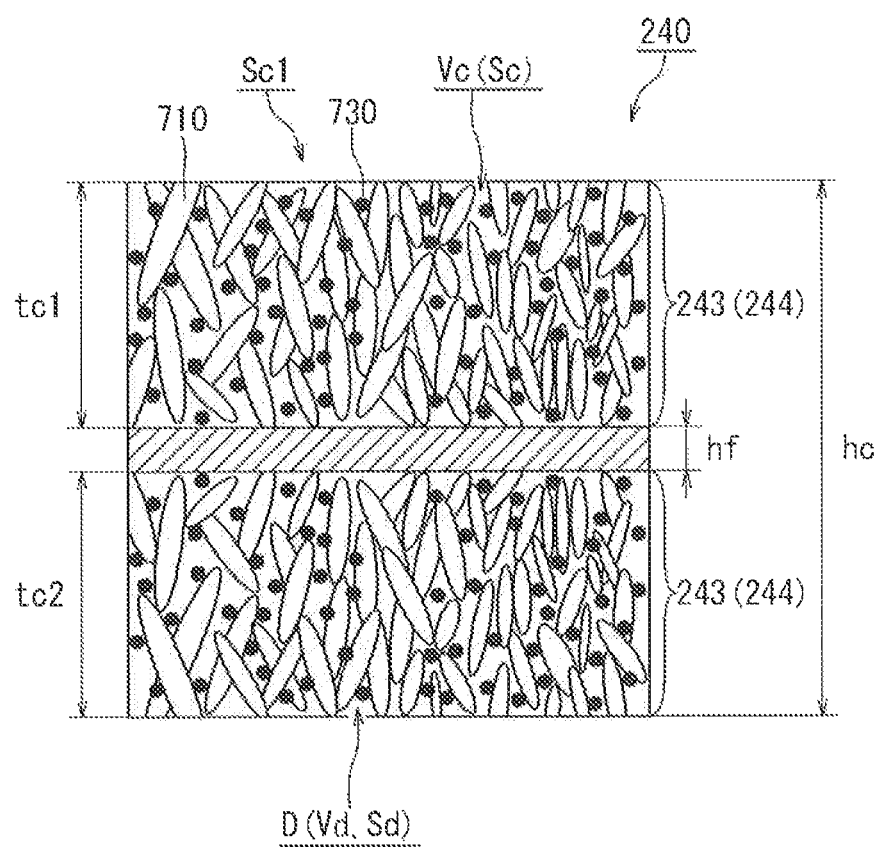
FIG. 6 is a cross-sectional view illustrating the structure of a negative electrode mixture layer.

FIG. 5 is a cross-sectional view of the positive electrode sheet 220 of the lithium-ion secondary battery 100. FIG. 6 is a cross-sectional view of the negative electrode sheet 240 of the lithium-ion secondary battery 100. In FIG. 5, positive electrode active material 610, conductive material 620, and binder 630 in the positive electrode mixture layer 223 are enlarged schematically so that the structure of the positive electrode mixture layer 223 can be seen clearly. Likewise, in FIG. 6, negative electrode active material 710 and binder 730 in the negative electrode mixture layer 243 are enlarged schematically so that the structure of the negative electrode mixture layer 243 can be seen clearly. Here, the figure depicts a case in which what is called flake graphite is used as the negative electrode active material 710, but the negative electrode active material 710 is not limited to the example shown in the figure. In the lithium-ion secondary battery 100 of this embodiment, the porosity E1 of the positive electrode mixture layer 223 is $0.30 \leq E1$ and the porosity E2 of the negative electrode mixture layer 243 is $0.30 \leq E2$. The positive electrode active material 610 (see FIG. 5) is a lithium transition metal oxide containing nickel, cobalt, and manganese, in which W and Zr are add.

<<Positive Electrode Mixture Layer 223>>

As illustrated in FIG. 5, in this embodiment, the positive electrode mixture 224 is coated on both faces of the positive electrode current collector 221. Each of the layers of the positive electrode mixture 224 (the positive electrode mixture layers 223) contains the positive electrode active material 610 and the conductive material 620. In this embodiment, the positive electrode mixture layer 223 further contains a binder (binder agent) 630.

<<Positive Electrode Active Material 610>>

Herein, the positive electrode active material 610 is formed of secondary particles, each in which a plurality of primary particles (not shown) of lithium-transition metal oxide are aggregated. The particle size of such a secondary particle is from about 3 μm to about 12 μm, more preferably from about 3 μm to about 8 μm. It should be noted that the measure of the particle size employed herein is the median diameter (d50) that is obtained from the particle size distribution determined by a particle size distribution analyzer based on a light-scattering method. Hereinbelow, the term "positive electrode active material 610" means the secondary particle unless otherwise stated. In addition, for the positive electrode active material 610, it is preferable to use such a particle that a plurality of primary particles (not shown) are aggregated to form a secondary particle.

<<Conductive Material 620>>

For the conductive material 620, it is possible to use carbon powder, such as acetylene black, oil-furnace black, graphitized carbon black, carbon black, graphite, Ketjen Black, and graphite powder. In this case, one or a plurality of kinds of carbon powders may be mixed at a predetermined proportion in the conductive material 620. Here, the conductive material 620 has a smaller particle size than that of the positive electrode active material 610. The particle size of the conductive material 620 may be, for example, from 20 nm to 80 nm.

<<Negative Electrode Mixture Layer 243>>

As illustrated in FIG. 6, the negative electrode mixture 244 is coated on both faces of the negative electrode current collector 241. Each layer of the negative electrode mixture 244 (the negative electrode mixture layers 243) contains the negative electrode active material 710. In this embodiment, the negative electrode mixture layer 243 further contains a binder (binder agent) 730. The negative electrode active material used for the negative electrode mixture layer 243 is not particularly limited to flake graphite.

<<Pore>>

Here, the positive electrode mixture layer 223 has tiny gaps B, which may be called voids, for example, between the particles of the positive electrode active material 610 and the conductive material 620. The tiny gaps in the positive electrode mixture layer 223 can be impregnated with the electrolyte solution (not shown). Likewise, the negative electrode mixture layer 243 has tiny gaps, which may be called voids, for example, between the particles of the negative electrode active material 710. The tiny gaps in the negative electrode mixture layer 243 can be impregnated with the electrolyte solution (not shown). Depending on the structure of the positive electrode active material 610 and the negative electrode mixture layer 243, the positive electrode active material 610 and the negative electrode active material 710 may also have voids. Thus, the positive electrode mixture layer 223 and the negative electrode mixture layer 243 have gaps (or voids) therein. Herein, such gaps (or voids) are referred to as "pores" as appropriate.

The operation of the lithium-ion secondary battery 100 during charge and during discharge will be described in the following.

<<Operation During Charge>>

Figure 7:
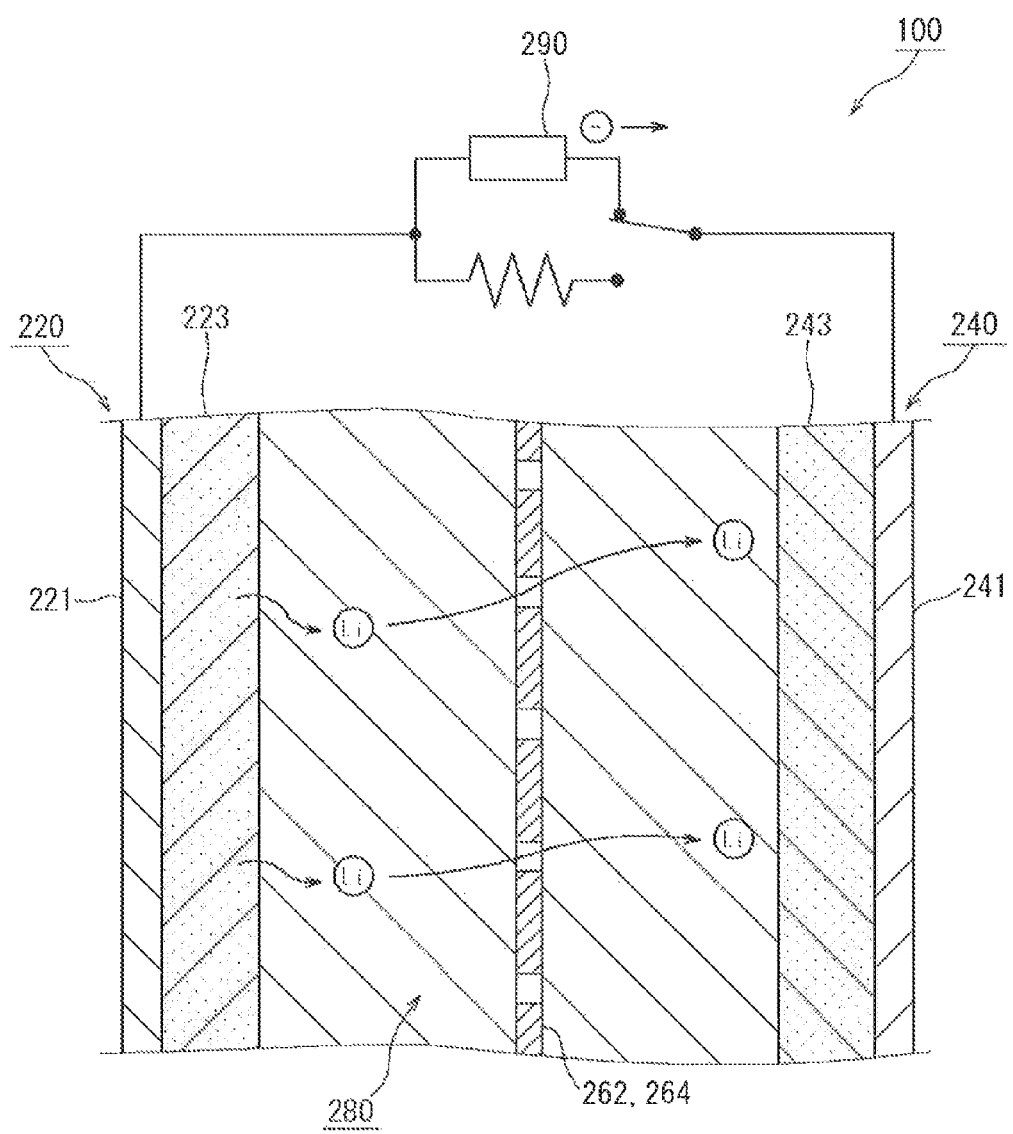
FIG. 7 is a view schematically illustrating a state of the lithium-ion secondary battery during charge.

FIG. 7 schematically illustrates the state of the lithium-ion secondary battery 100 during charge. During charge, the electrode terminals 420 and 440 (see FIG. 1) of the lithium-ion secondary battery 100 are connected to a charger 290, as illustrated in FIG. 7. By the working of the charger 290, lithium ions are released into the electrolyte solution 280 from the positive electrode active material 610 (see FIG. 5) in the positive electrode mixture layer 223 during charge. In addition, electric charge is released from the positive electrode active material 610 (see FIG. 5). As illustrated in FIG. 7, the released electric charge is sent via the conductive material 620 to the positive electrode current collector 221 and further sent via the charger 290 to the negative electrode. In the negative electrode, electric charge is stored, and also the lithium ions in the electrolyte solution 280 are absorbed and stored in the negative electrode active material 710 (see FIG. 6) within the negative electrode mixture layer 243.

<<Operation During Discharge>>

Figure 8:
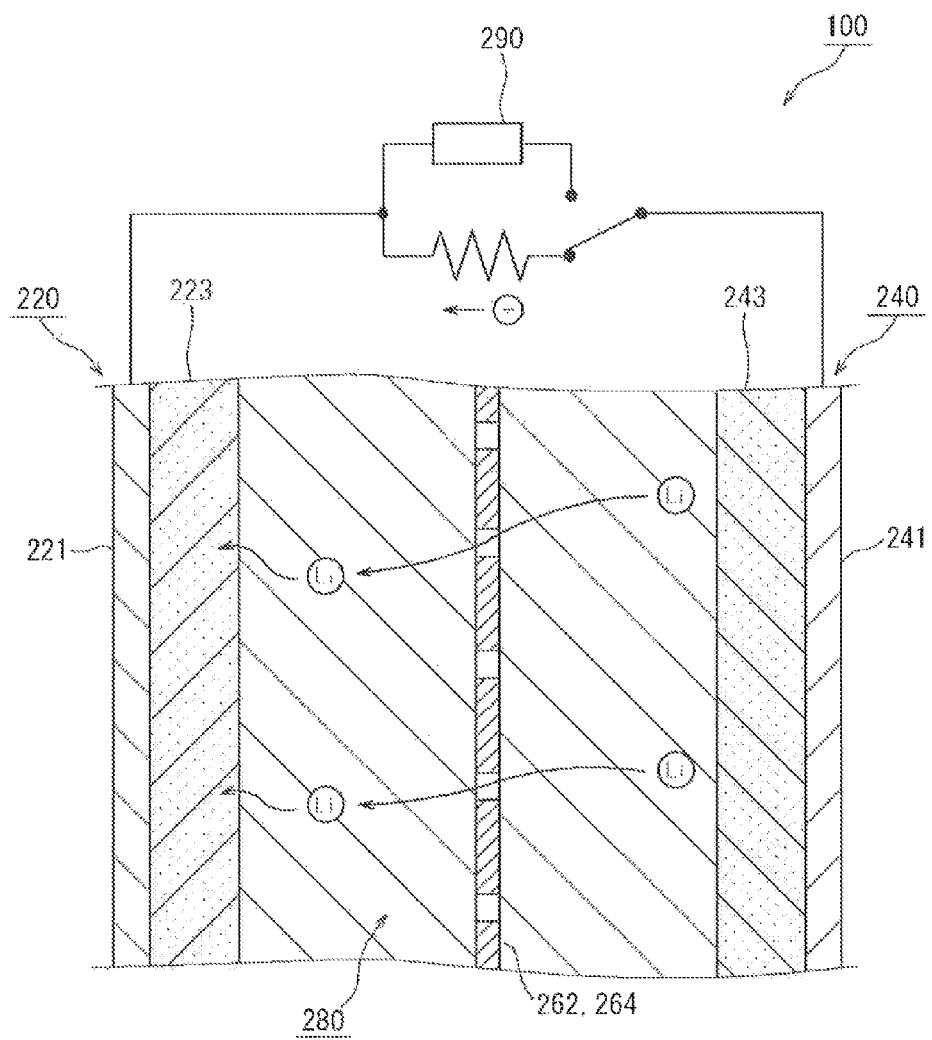
FIG. 8 is a view schematically illustrating a state of the lithium-ion secondary battery during discharge.

FIG. 8 schematically illustrates the state of the lithium-ion secondary battery 100 during discharge. During discharge, as illustrated in FIG. 8, electric charge is transferred from the negative electrode to the positive electrode, and the lithium ions (Li ions) stored in the negative electrode mixture layer 243 are released into the electrolyte solution 280. Also, in the positive electrode, the lithium ions (Li) in the electrolyte solution 280 are absorbed into the positive electrode active material 610 within the positive electrode mixture layer 223.

Thus, during the charge and discharge of the secondary battery 100, lithium ions (Li) are transferred back and forth between the positive electrode mixture layer 223 and the negative electrode mixture layer 243 via the electrolyte solution 280. For this reason, it is desirable that the positive electrode mixture layer 223 have necessary pores B around the positive electrode active material 610 (see FIG. 5) such that they can be impregnated with the electrolyte solution 280. Such a configuration allows the electrolyte solution to exist sufficiently around the positive electrode active material 610. This enables smooth transfer of lithium ions (Li) between the electrolyte solution 280 and the positive electrode active material 610.

In addition, during charge, electric charge is transferred from the positive electrode active material 610 via the conductive material 620 to the positive electrode current collector 221. On the other hand, during discharge, electric charge is returned from the positive electrode current collector 221 via the conductive material 620 to the positive electrode active material 610. The positive electrode active material 610 is made of a lithium transition metal oxide, and it is poor in electrical conductivity. For this reason, the electric charge transfer between the positive electrode active material 610 and the positive electrode current collector 221 is carried out mainly through the conductive material 620.

Thus, it is believed that, in the case of charge, more efficient and more rapid charge becomes possible when the transfer of lithium ions and the transfer of electric charge take place more smoothly. It is also believed that, in the case of discharge, when the transfer of lithium ions and the transfer of electrons take place more smoothly, the resistance in the battery lowers, and accordingly, the output power of the battery increases.

<<Problem in Low-Temperature Environment>>

However, the transfer rate of lithium ions in the electrolyte solution becomes slower in a low-temperature environment of for example, about −30° C. As a consequence, the rate-controlling factor decreases during charge and during discharge. Therefore, the output power of the lithium-ion secondary battery 100 decreases in such an environment.

<<Lithium-Ion Secondary Battery 100>>

In this embodiment, the positive electrode mixture layer 223 is coated on the positive electrode current collector 221, and it contains at least the positive electrode active material 610 and the conductive material 350, as illustrated in FIG. 5. The negative electrode mixture layer 243 is coated on the negative electrode current collector 241, and it contains at least the negative electrode active material 710, as illustrated in FIG. 6. Although not shown in the drawings, the electrolyte solution contains lithium ions at a predetermined concentration. The positive electrode mixture layer 223 and the negative electrode mixture layer 243 have respective pores B and D in which the electrolyte solution is impregnated. In this lithium-ion secondary battery 100, the number of lithium ions X in the electrolyte solution impregnated per 1 cm$^3$ of the positive electrode mixture layer 223 and the number of lithium ions Y in the electrolyte solution impregnated per 1 cm$^3$ of the negative electrode mixture layer 243 are both $175 \times 10^{19}$ or greater.

<<Number of Lithium Ions X>>

Here, the number of lithium ions X is the number of lithium ions in the electrolyte solution impregnated per 1 cm$^3$ of the positive electrode mixture layer 223. The number of lithium ions X can be obtained by, for example, the following equation: X=(the volumetric capacity Vb of the pores B in the positive electrode mixture layer 223 per 1 cm$^3$ of the positive electrode mixture layer 223)×(the lithium ion concentration L (mol/L) of the electrolyte solution)×Avogadro's number (NA).

<<Number of Lithium Ions Y>>

Likewise, the number of lithium ions Y is the number of lithium ions in the electrolyte solution impregnated per 1 cm$^3$ of the negative electrode mixture layer 243. The number of lithium ions Y can be obtained by the following equation: Y=(the volumetric capacity Vd of the pores D in the negative electrode mixture layer 243 per 1 cm$^3$ of the negative electrode mixture layer 243)×(the lithium ion concentration L (mol/L) of the electrolyte solution)×Avogadro's number (NA).

A sufficient amount of lithium ions (Li ions) per unit volume exist in each of the positive electrode mixture layer 223 and the negative electrode mixture layer 243 of such a lithium-ion secondary battery 100. Therefore, during charge and discharge, the positive electrode active material 610 and the negative electrode active material 710 absorb and release lithium ions (Li ions) from and to the electrolyte solution that is impregnated in the positive electrode mixture layer 223 and the negative electrode mixture layer 243. As a result, electrochemical reactions can be performed appropriately in the positive electrode and the negative electrode, for example, even in a low-temperature environment at about −30° C., in which the transfer rate of lithium ions in the electrolyte solution is considerably slow. Therefore, the decrease of the output power of the lithium-ion secondary battery 100 can be inhibited.

The number of lithium ions X and the number of lithium ions Y may be both greater than $3.75 \times 10^{19}$. In this case, a greater amount of lithium ions (Li ions) per unit volume exist in each of the positive electrode mixture layer 223 and the negative electrode mixture layer 243 of the lithium-ion secondary battery 100. Therefore, the decrease in the output power of the lithium-ion secondary battery 100 can be inhibited even further.

<<Volumetric Capacity Vb, Vd>>

The volumetric capacity Vb of the pores B in the positive electrode mixture layer of 223 per 1 cm$^3$ of the positive electrode mixture layer 223 can be obtained based on the proportion of the pores B in the positive electrode mixture layer 223. Likewise, the volumetric capacity Vd of the pores D in the negative electrode mixture layer 243 per 1 cm$^3$ of the negative electrode mixture layer 243 can be obtained based on the proportion of the pores F) in the negative electrode mixture layer 243.

Here, the proportion of the pores B in the positive electrode mixture layer 223 and the proportion of the pores D in the negative electrode mixture layer 243 are also referred to as porosity or void fraction. The porosity E1 of the positive electrode mixture layer 223 is, for example, obtained by dividing the volumetric capacity Vb of the pores B contained in the positive electrode mixture layer 223 by the apparent volume Va of the positive electrode mixture layer 223 (Vb/Va). The porosity E2 of the negative electrode mixture layer 243 is obtained by dividing the volumetric capacity Vd of the pores D contained in the negative electrode mixture layer 243 by the apparent volume Vc of the positive electrode mixture layer 243 (Vd/Vc).

That is, the porosity E1 of the positive electrode mixture layer 223 is represented as: porosity E1 (Vb/Va), and the porosity E2 of the negative electrode mixture layer 243 is represented as: porosity E=(Vd/Vc).

In the above equations:

Vb is the volumetric capacity of the pores contained in the positive electrode mixture layer 223;

Va is the apparent volume of the positive electrode mixture layer 223;

Vd is the volumetric capacity of the pores D contained in the negative electrode mixture layer 243; and Vc is the apparent volume of the negative electrode mixture layer 243.

<<Definition of Porosity>>

Herein, the term "porosity" refers to the proportion of pores in the positive electrode mixture layer 223 and the negative electrode mixture layer 243. For example, "the porosity E1 of the positive electrode mixture layer 223" is the ratio (Vb/Va) of the volumetric capacity Vb of the pores (B) formed in the positive electrode mixture layer 223 to the apparent volume Va of the positive electrode mixture layer 223. Likewise, "the porosity E2 of the negative electrode mixture layer 243" is the ratio (Vd/Vc) of the volumetric capacity Vd of the pores D formed in the negative electrode mixture layer 243 to the apparent volume Vc of the positive electrode mixture layer 243.

<<How to Obtain Porosity E1 (Vb/Va) and Porosity E2 (Vd/Vc)>>

The porosity E1 (Vb/Va) can be obtained, for example, by dividing the volumetric capacity Vb of the pores contained in the positive electrode mixture layer 223 by the apparent volume Va of the positive electrode mixture layer 223. The porosity E2 (Vd/Vc) of the negative electrode mixture layer 243 can be obtained by dividing the volumetric capacity Vd of the pores contained in the negative electrode mixture layer 243 by the apparent volume Vc of the positive electrode mixture layer 243.

<<Method for Measuring Va and Vc>>

As illustrated in FIG. 5, for example, the apparent volume Va of the positive electrode mixture layer 223 can be obtained by the product of the area Sa1 of a sample of the positive electrode sheet 220 as viewed in plan and the thickness ta (not shown) of the positive electrode mixture layer 223 (i.e., Va=Sa1×ta). As illustrated in FIG. 6, for example, the apparent volume Vc of the negative electrode mixture layer 243 can be obtained by the product of the area Sc1 of a sample of the negative electrode sheet 240 as viewed in plan and the thickness tc (not shown) of the negative electrode mixture layer 243 (i.e., Vc=Sc1×tc).

In this embodiment, the positive electrode mixture layer 223 is formed on both faces of the positive electrode current collector 221. Accordingly, the thickness ta of the positive electrode mixture layer 223 can be obtained, for example, as the sum of the thickness ta1 and the thickness ta2 of the respective positive electrode mixture layers 223 (i.e., ta=ta1+ta2). Alternatively, the thickness ta of the positive electrode mixture layer 223 can be obtained as the difference between the total thickness ha of the positive electrode sheet 220 and the thickness he of the positive electrode current collector 221 (i.e., ta=ha−he). In addition, the area Sa1 of a sample of the positive electrode sheet 220 as viewed in plan can be easily obtained by, for example, cutting out the sample of the positive electrode sheet 220 in a square or rectangular shape. Thus, the apparent volume Va of the positive electrode mixture layer 223 can be obtained by obtaining the area Sa1 of a sample of the positive electrode sheet 220 as viewed in plan and the thickness ta of the positive electrode mixture layer 223.

In addition, in this embodiment, the negative electrode mixture layer 243 is formed on both faces of the negative electrode current collector 241. The thickness tc of the negative electrode mixture layer 243 can be obtained as the sum of the thickness tc1 and the thickness tc2 of the respective negative electrode mixture layers 243 (i.e., tc=tc1+tc2). The thickness tc of the negative electrode mixture layer 243 can also be obtained as the difference between the total thickness he of the negative electrode sheet 240 and the thickness hf of the negative electrode current collector 241 tc=hc−hf). In addition, the area Sc1 of a sample of the negative electrode sheet 240 as viewed in plan can be easily obtained by, for example, cutting out the sample of the positive electrode sheet 220 in a square or rectangular shape. Thus, the apparent volume Vc of the negative electrode mixture layer 243 can be obtained by obtaining the area Sc1 of a sample of the negative electrode sheet 240 as viewed in plan and the thickness tc of the negative electrode mixture layer 243.

<<Method for Measuring Vb and Vd>>

The volumetric capacity Vb of the pores (B) formed in the positive electrode mixture layer 223 and the volumetric capacity Vd of the pores (D) formed in the negative electrode mixture layer 243 can be measured by, for example, using a mercury porosimeter. In this measurement method, the term "pore" means a pore that is open to the outside. The closed space inside the positive electrode mixture layer 223 and the negative electrode mixture layer 243 is not included in the "pore" in this method. The mercury porosimeter is a device of measuring the pore distribution of a porous material using a mercury intrusion technique. For the mercury porosimeter, it is possible to use, for example, Autopore III 9410 made by Shimadzu Corp. When this mercury porosimeter is used, the volumetric capacity distribution of the pores corresponding to the pore range of from 50 μm to 0.003 μm can be determined by performing the measurement at, for example, from 4 psi to 60,000 psi.

For example, a plurality of samples are cut out from the positive electrode sheet 220. Subsequently, using a mercury porosimeter, the volumetric capacity of the pores contained in the positive electrode mixture layer 223 is measured for the sample. The mercury porosimeter is a device of measuring the pore distribution of a porous material by a mercury intrusion technique. In the mercury intrusion technique, a sample of the positive electrode sheet 220 is firstly immersed in mercury in an evacuated condition. As the pressure applied to the mercury increases in this condition, the mercury gradually intrudes into smaller space. Accordingly, the size and the volumetric capacity distribution of the pores B in the positive electrode mixture layer 223 can be obtained based on the relationship between the amount of the mercury intruded in the positive electrode mixture layer 223 and the pressure applied to the mercury. The volumetric capacity Vb of the pores B contained in the positive electrode mixture layer 223 can be obtained by such a mercury intrusion technique. The volumetric capacity of the pores D contained in the negative electrode mixture layer 243 Vd can be likewise obtained by the mercury intrusion technique.

<<Calculation of Porosity E1 (Vb/Va) and Porosity E2 (Vd/Vc)>>

The porosity E1 (Vb/Va) of the positive electrode mixture layer 223 can be obtained by the ratio of the volumetric capacity Vb of the pores B contained in the positive electrode mixture layer 223 to the apparent volume Va of the positive electrode mixture layer 223, which are obtained in the above-described manner. The porosity E1 (Vb/Va) obtained here indicates the proportion of the volume of the pores in the positive electrode mixture layer 223, in which the electrolyte solution can be impregnated. Also, the porosity E2 (Vd/Vc) of the negative electrode mixture layer 243 can be obtained by the ratio (Vd/Vc) of the volumetric capacity Vd of the pores D contained in the negative electrode mixture layer 243 to the apparent volume Vc of the positive electrode mixture layer 243. The porosity E2 (Vb/Va) obtained here indicates the proportion of the volume of the pores in the positive electrode mixture layer 243, in which the electrolyte solution can be impregnated.

<<How to Obtain Porosity (Void Fraction) (2)>>

The porosity E1 (Vb/Va) can be approximated by, for example, the ratio (Sb/Sa) of the area Sb occupied by the pores B contained per unit cross-sectional area of the positive electrode mixture layer 223 to the apparent cross-sectional area Sa of the positive electrode mixture layer 223, in a cross section sample of the positive electrode mixture layer 223. In this case, it is desirable to obtain the ratio (Sb/Sa) from a plurality of cross section samples of the positive electrode mixture layer 223. Moreover, the just-mentioned ratio (Sb/Sa) can also be approximated by, for example, the ratio (Db/Da) of the number of pixels Db contained in the region identified as the pores B of the positive electrode mixture layer 223 to the number of pixels Da of the region of the positive electrode mixture layer 223, in a cross-sectional SEM image. In this case, the greater the number of the cross section samples of the positive electrode mixture layer 223, the more accurately the porosity (Vb/Va) can be approximated by the just-mentioned ratio (Sb/Sa). In this case, for example, it is desirable to take the cross section samples along one arbitrary direction of the positive electrode sheet 220, from a plurality of cross sections that are orthogonal to the arbitrary direction.

Hereinabove, a method for measuring the porosity E1 (Vb/Va) of the positive electrode mixture layer 223 has been described, but the porosity E2 (Vd/Vd) of the negative electrode mixture layer 243 can also be measured based on cross section samples in a like manner. The porosity E2 (Vd/Vd) can be approximated by, for example, the ratio (Sd/Sc) of the area Sd occupied by the pores D contained per unit cross-sectional area of the negative electrode mixture layer 243 to the apparent cross-sectional area Sc of the negative electrode mixture layer 243, in a cross section sample of the negative electrode mixture layer 243. In this case, it is desirable to obtain the ratio (Sd/Sc) from a plurality of cross section samples of the negative electrode mixture layer 243.

For the cross section samples of the positive electrode mixture layer 223, arbitrary cross sections of the positive electrode sheet 220 can be obtained, for example, using a CP process (Cross Section Polisher process). In addition, for such cross section samples, cross-sectional SEM images (cross-sectional photographs) can be obtained by an electron microscope, for example. As the electron microscope, it is possible to use a scanning electron microscope (FE-SEM) HITACHI S-4500 made by Hitachi High-Technologies Corp., for example. With such cross-sectional SEM images of the positive electrode mixture layer 223, the pores B that are formed in a cross section of the substance that forms the positive electrode mixture layer 223 or inside the positive electrode mixture layer 223 can be identified based on differences in color tone or shade. Such identification can be performed by an image processing technique using a computer.

<<Deterioration of Capacity Retention Ratio>>

As described previously, when the number of lithium ions X and the number of lithium ions Y are both $335 \times 10^{19}$ or greater, it is possible to inhibit the decrease in the output power of the lithium-ion secondary battery 100 especially in a low-temperature environment at about −30° C. However, when the number of lithium ions X and the number of lithium ions Y were both $8.6 \times 10^{20}$ or greater, it was observed that the capacity retention ratio was deteriorated in a relatively high-temperature environment at about 60° C., for example. Such an event was observed when, for example, the negative electrode mixture layer 243 have too many lithium ions (Li ions).

Therefore, it is also possible that the value Y1 obtained by dividing the number of lithium ions Y by the weight (g) of the negative electrode active material 710 contained per 1 cm$^3$ of the negative electrode mixture layer may be set to $43 \times 10^{14}$ or less. Such a value Y1 indicates how many lithium ions (Li ions) are contained per unit weight (per 1 g here) of negative electrode active material of the negative electrode mixture layer 243. It is preferable that the value VI not be excessively high. For example, it is preferable that the value Y1 be $4.3 \times 10^{14}$ or less. It is preferable that the value Y1 not be excessively high, and when the value Y1 is $4.3 \times 10^{14}$ or less, it is almost unable to observe the event in which the capacity retention ratio decreases in a temperature environment of about 60° C. The capacity of the lithium-ion secondary battery 100 can be retained easily even in a temperature environment at about 60° C.

<<Density A1 of Positive Electrode Mixture Layer 223>>

Moreover, the density A1 of the positive electrode mixture layer 223 may be 1.9 g/cm$^3$ or less (i.e., A1≤1.9 g/cm$^3$). In this case, the pores B in the positive electrode mixture layer 223 increase, and the amount of the electrolyte solution contained in the positive electrode mixture layer 223 increases accordingly. The density A1 of the positive electrode mixture layer 223 may be approximately 1.9 g/cm$^3$ or less (A1≤1.9 g/cm$^3$).

When the density A1 of the positive electrode mixture layer 223 is lowered, there may be cases in which the electron resistance in the positive electrode mixture layer 223 increases and the direct current resistance of the secondary battery 100 becomes higher. On the other hand, when a greater amount of the conductive material 620 is added, the electron resistance of the positive electrode mixture layer 223 decreases, and the direct current resistance of the secondary battery 100 lowers. However, adding a greater amount of the conductive material 620 means an increase in the material cost of the lithium-ion secondary battery 100. Moreover, adding a greater amount of the conductive material 620 can be a cause of an increase in the weight of the lithium-ion secondary battery 100. As for the vehicle drive battery, demands for size reduction and weight reduction are high.

<<Bulk Density A2 of Conductive Material 223>>

In that case, the amount of the conductive material 620 used per one cell can be reduced by using a conductive material 620 having a smaller bulk density A2. More specifically, a conductive material 620 having a smaller bulk density A2 has a greater volume relative to its weight. For this reason, it is possible to form an appropriate conductive path in the positive electrode mixture layer 223 with a smaller amount of conductive material. From this point of view, it is desirable that the bulk density A2 of the conductive material 620 be approximately 0.04 g/cm$^3$ or less (i.e., A2≤0.04 g/mL) when the density A1 of the positive electrode mixture layer 223 is 1.9 g/cm$^3$ or less (A1≤1.9 g/cm$^3$). Here, the bulk density A2 of the conductive material 620 may be measured according to JIS K 6219-2, for example.

The weight ratio A3 of the conductive material 620 to the positive electrode active material 610 may be set to 11% while at the same time setting the density A1 of the positive electrode mixture layer 223 to approximately 1.9 g/cm$^3$ or less (A1≤1.9 g/cm$^3$) and setting the bulk density A2 of the conductive material 620 to approximately 0.04 g/cm$^3$ or less (A2≤0.04 g/mL) as described above.

The technical significance of the lithium-ion secondary battery 100 proposed by the present application is represented by the following various evaluation tests.

<<Evaluation Test Battery>>

Figure 9:
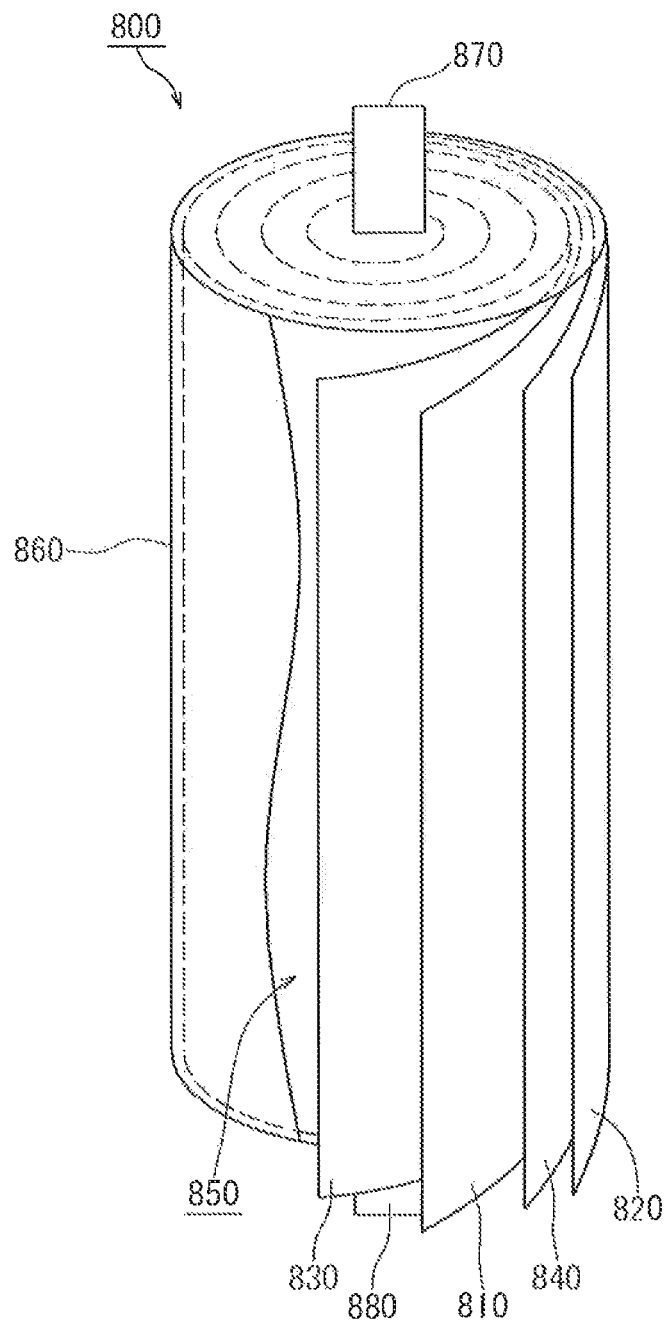
FIG. 9 is a schematic view of a 18650-type cell used in an evaluation test.

FIG. 9 schematically shows an evaluation test battery 800. The evaluation test battery 800 prepared here is a cylindrical lithium-ion secondary battery, which is commonly called a 18650-type cell. Herein, the rated capacity of the evaluation test battery 800 was set at about 300 mAh.

For this evaluation test battery 800, as illustrated in FIG. 9, a positive electrode sheet 810, a negative electrode sheet 820, two sheets of separators 830 and 840 were laminated, and the laminated sheets were coiled so as to prepare a wound electrode assembly 850, in which the separators 830 and 840 were interposed between the positive electrode sheet 810 and the negative electrode sheet 820.

Here, the positive electrode sheet 810 and the negative electrode sheet 820 of the evaluation test battery 800 were configured to have substantially the same cross-sectional structure as that of the positive electrode sheet 220 and the negative electrode sheet 240 of the lithium-ion secondary battery 100 (see FIG. 1). A porous polyethylene sheet having a thickness of 20 μm was used for each of the separators 830 and 840. The wound electrode assembly 850 was enclosed in an outer case (not shown) together with a non-aqueous electrolyte solution, to construct an evaluation test battery 800 (18650-type lithium/ion battery for evaluation test).

In this evaluation test, active material particles having a composition represented as $Li_{1.15}Ni_{0.34}Co_{0.33}Mn_{0.33}O_2$ were used as the positive electrode active material 610. Here, the average particle size (d50) of the secondary particles of the active material particles was set at 3 μm to 12 μm. In this evaluation test, acetylene black (AB) was used as the conductive material 620. In this evaluation test, N-methyl-2-pyrrolidone (NMP) was used as the solvent. In addition, polyvinylidene fluoride (PVDF) was used for the binder 630.

The outer case 860 has, as illustrated in FIG. 9, a substantially cylindrical shape. Electrode terminals 870 and 880, which are connected to the positive electrode sheet 810 and the negative electrode sheet 820 therein, are provided at both side end portions of the cylindrical shape. The non-aqueous electrolyte solution used in this the evaluation test battery 800 was a non-aqueous electrolyte solution in which $LiPF_6$ was dissolved at a concentration of 1 mol/L in a mixed solvent of EC and DMC and EMC in a volume ratio of 3:3:4.

<<Conditioning>>

The conditioning process, the measurement of the rated capacity, and the SOC adjustment for the evaluation test battery constructed in the above-described manner will be described in that order.

Herein, the conditioning process is carried out by the following procedures 1 and 2.

Procedure 1: A battery is charged with a constant current at 1 C to 4.1 V and thereafter rested for 5 minutes.

Procedure 2: After procedure 1, the battery is charged with a constant voltage for 1.5 hours and then rested for 5 minutes.

Here, the charge rate 1 C is a current value at which a battery can pass in 1 hour. For example, for a battery with a rated capacity of 300 mAh, 1 C is 300 mA, and 2 C is 600 mA. For a battery with a rated capacity of 400 mAh, 1 C is 400 mA, and 2 C is 800 mA.

<<Measurement of Rated Capacity>>

Next, after the above-described conditioning process, the rated capacity is measured for each of the evaluation test batteries at a temperature of 25° C. and in a voltage range of from 3.0 V to 4.1 V, through the following procedures 1 through 3.

Procedure 1: A battery is discharged with a constant current at 1.0 to 3.0 V, then discharged with a constant voltage for 2 hours, and thereafter rested for 10 seconds.

Procedure 2: The battery is charged with a constant current at 1 C to 4.1 V, then charged with a constant voltage for 2.5 hours, and thereafter rested for 10 seconds.

Procedure 3: The battery is discharged with a constant current at 0.5 C to 3.0 V, then discharged with a constant voltage for 2 hours, and thereafter rested for 10 seconds. The discharge capacity (CCCV discharge capacity) in the discharge from the constant current discharge to the constant voltage discharge in procedure 3 is defined as the rated capacity.

<<SOC Adjustment>>

The SOC adjustment is performed through the following procedures 1 and 2 for the evaluation test battery prepared in the above-described manner under a temperature environment at 25° C. Here, it is preferable to perform the SOC adjustment after the above-described conditioning process and the measurement of rated capacity.

Procedure 1: A battery is charged from 3 V with a constant current at 1 C so as to be in a state of charge of about 60% of the rated capacity (60% SOC). Here, the term "SOC" means the state of charge.

Procedure 2; After procedure 1, the battery is charged with a constant voltage for 2.5 hours.

This enables the evaluation test battery 800 to be adjusted to a predetermined state of charge.

<<Low-Temperature High-Rate Charge-Discharge Test>>

Herein, a low-temperature high-rate charge-discharge test was carried out by repeating a charge-discharge operation for the evaluation test batteries 800, each fabricated according to a predetermined standard, with varied charge-discharge rates. Then, it was evaluated to what degree the resistance of each of the evaluation test batteries 800 increased after the charge-discharge operation was repeated a predetermined number of times. In the low-temperature high-rate charge-discharge test, a charge-discharge operation was repeated 1000 times in a temperature environment at about 0° C. at a predetermined charge-discharge rate. Each of the charge and discharge was performed with a constant current, and each resting period between the charge and the discharge was set at 10 minutes.

In this embodiment, the charge-discharge operation was performed for 10 seconds at charge-discharge rates of 15 C (current value: 4.5 A), 20 C (current value: 6.0 A), 25 C (current value: 7.5 A), and 30 C (current value: 9.0 A).

<<When the Charge-Discharge Rate is 15 C>>

When the charge-discharge rate is 15 C in this case, the charge-discharge operation is performed at a current value of 4.5 A for 10 seconds. In this case, the amount of electric charge (i.e., the amount of consumed electric charge) that is transferred in one charge or discharge operation is 45 coulombs. Note that, herein, the amount of electric charge consumed during discharge is referred to as the amount of consumed electric charge. When converted into the number of electrons, the just-mentioned amount of consumed electric charge is 45÷elementary charge ($1.60217733 \times 10^{-19}$), which is about 2.81E+20. Here, the lithium ion (Li) is a monovalent cation. Therefore, the just-mentioned number of electrons is the same number as the number of lithium ions that are absorbed into or released from the positive electrode or the negative electrode during charge/discharge (the number of consumed lithium ions Z herein). Therefore, the number of consumed lithium ions Z is approximately 2.81E+20. Herein, the number of consumed lithium ions Z means the number of lithium ions that are absorbed into the positive electrode active material 610 during discharge.

<<When the Charge-Discharge Rate is 20 C>>

When the charge-discharge rate is 20 C, the charge-discharge operation is performed at a current value of 6.0 A for 10 seconds. In this case, the amount of electric charge (i.e., the amount of consumed electric charge) that is transferred in one charge or discharge operation is 60 coulombs. When converted into the number of electrons, the just-mentioned amount of consumed electric charge is 60 elementary charge ($1.60217733 \times 10^{-19}$). Therefore, the number of consumed lithium ions Z is approximately 3.7E+20.

<<When the Charge-Discharge Rate is 25 C>>

When the charge-discharge rate is 25 C, the charge-discharge operation is performed at a current value of 7.5 A for 10 seconds. In this case, the amount of electric charge (i.e., the amount of consumed electric charge) that is transferred in one charge or discharge operation is 75 coulombs. When converted into the number of electrons, the just-mentioned amount of consumed electric charge is 75÷elementary charge ($1.60217733 \times 10^{-19}$). Therefore, the number of consumed lithium ions Z is approximately 4.7E+20.

<<When the Charge-Discharge Rate is 30 C>>

When the charge-discharge rate is 30 C, the charge-discharge operation is performed at a current value of 9.0 A for 10 seconds. In this case, the amount of electric charge the amount of consumed electric charge) that is transferred in one charge or discharge operation is 90 coulombs. When converted into the number of electrons, the just-mentioned amount of consumed electric charge is 90÷elementary charge ($1.60217733 \times 10^{19}$). Therefore, the number of consumed lithium ions Z is approximately 5.6E+70.

<<Resistance Increase Rate>>

As the resistance increase rate, it was evaluated to what degree the resistance of the evaluation test battery 800 increased before and after the above-described charge-discharge cycle. The resistance values of the evaluation test battery 800 were measured respectively before the charge-discharge cycle and after the charge-discharge cycle. The value (R1/R2) obtained by dividing the resistance R1 of the evaluation test battery 800 after the charge-discharge cycle by the resistance R2 of the evaluation test battery 800 before the charge-discharge cycle was determined as the resistance increase rate. Thus, it is indicated that the closer the just-mentioned resistance increase rate is to 1, the less the increase in resistance, and the greater it is, the greater the increase in resistance.

Resistance increase rate=$(R1/R2)$

R1=the resistance of evaluation test battery 800 after the charge-discharge cycle was carried out
R2=the resistance of evaluation test battery 800 before the charge-discharge cycle was carried out
<<Resistance of Evaluation Test Battery 800>>

Herein, the resistance of the evaluation test battery 800 was evaluated by I-V resistance. The I-V resistance is measured in the following manner. Under a temperature condition of about 25° C., each of the batteries is discharged to 3.0 V with a constant current, and thereafter charged in a constant-current constant-voltage mode so as to be adjusted to 60% SOC (state of charge). Thereafter, at about 25° C., each of the batteries was charged for 10 seconds and discharged for 10 seconds alternately under the conditions of 1 C, 3 C, and 5 C, and the voltage values obtained at 10 seconds after the start of the discharge were plotted, to prepare an IN characteristic graph for each of the batteries. From the slope of the I-V characteristic graph, the I-V resistance value (me) at 25° C. was calculated.
<<Samples 1-11>>

Figure 10:
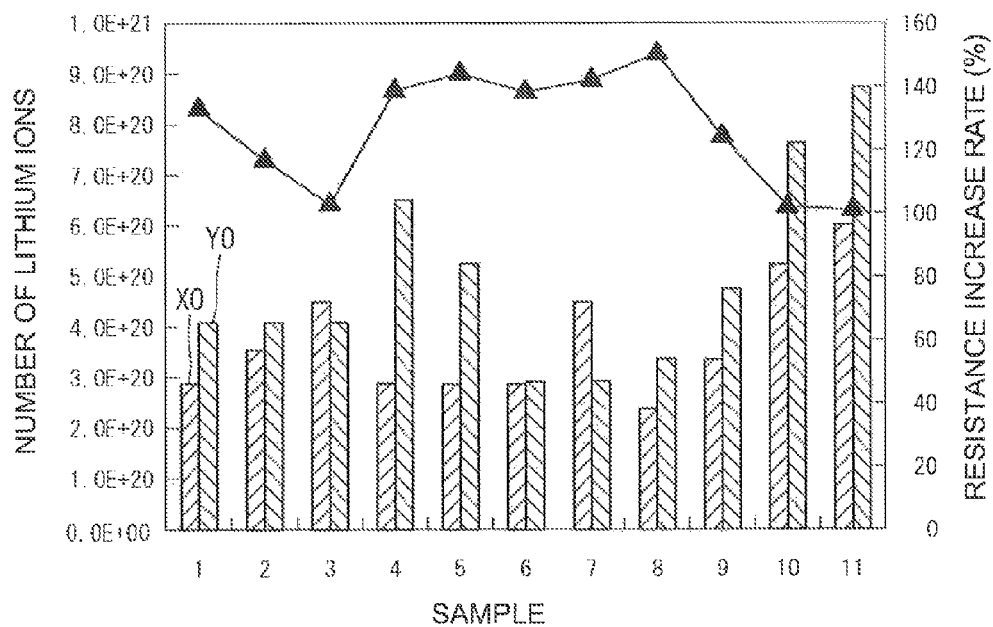
FIG. 10 is a graph illustrating the relationship between number of lithium ions X0, number of lithium ions Y0, and resistance increase rate (%) in a charge-discharge operation at 20 C, for samples 1 through 11.

Table 1 here shows the number of lithium ions X0 contained in the positive electrode mixture layer 223, the number of lithium ions Y0 contained in the negative electrode mixture layer 243, the resistance increase rate, the number of lithium ions Y1 per 1 g of the negative electrode active material, and the capacity retention ratio, for samples 1 through 11. FIG. 10 shows the number of lithium ions X0, the number of lithium ions Y0, and the resistance increase rate (%) in a charge-discharge operation at 20 C, fear each of samples 1 through 11.

<<Number of Lithium Ions X0 Contained in Positive Electrode Mixture Layer 223>>

Herein, the "number of lithium ions X0 contained in the positive electrode mixture layer 223" is the number of lithium ions in the electrolyte solution impregnated in the positive electrode mixture layer 223, assuming that the electrolyte solution is impregnated in the pores B of the positive electrode mixture layer 223, for example, as illustrated in FIG. 5. On the other hand, the foregoing "number of lithium ions X of the positive electrode mixture layer 223" is the number of lithium ions in the electrolyte solution impregnated per 1 $cm^3$ of the positive electrode mixture layer 223.

Here, the number of lithium ions X0 of the positive electrode mixture layer 223 is calculated by the following equation:

(the number of lithium ions $X0$ of the positive electrode mixture layer 223)=the volumetric capacity $Vb$ of the pores $B$ in the positive electrode mixture layer 223)×(the lithium ion concentration $L$ (mol/L) of the electrolyte solution)×Avogadro's number (NA).

Alternatively, the number of lithium ions X0 of the positive electrode mixture layer 223 may also be calculated by the following equation:

(the number of lithium ions $X0$ of the positive electrode mixture layer 223)=(the volumetric capacity $Vb$ of the pores $B$ per 1 $cm^3$ of the positive electrode mixture layer 223)×(the lithium ion concentration $L$ (mol/L) of the electrolyte solution)×Avogadro's number (NA)×(the volume ($cm^3$) of the positive electrode mixture layer 223).

The number of lithium ions X in the electrolyte solution impregnated per 1 $cm^3$ of the positive electrode mixture layer 223 is obtained by the following equation;

(the number of lithium ions $X$ in the electrolyte solution impregnated per 1 $cm^3$ of the positive electrode mixture layer 223) (the number of lithium ions $X0$ of the positive electrode mixture layer 223)÷(the volume ($cm^3$) of the positive electrode mixture layer 223).

TABLE 1

|  | Charge-discharge rate | | | |
|---|---|---|---|---|
|  | 15 C | 20 C | 25 C | 30 C |
| Curreut value (A) | 4.5 | 6 | 7.5 | 9 |
| Charge-discharge time (s) | 10 | 10 | 10 | 10 |
| Amount of consumed electric charge (coulomb) | 45 | 60 | 75 | 90 |
| Number of consumed Li ions Z | 2.81E+20 | 3.7E+20 | 4.7E+20 | 5.6E+20 |

| Sample | Number of Li ions X0 | Number of Li ions Y0 | Resistance increase rate | | | | Number of Li-ions Y1 per 1 g of negative electrode active material | Capacity retention ratio |
|---|---|---|---|---|---|---|---|---|
| 1 | 2.9E+20 | 4.1E+20 | 1.02 | 1.34 | 1.46 | 1.97 | 2.31E+14 | 85.6 |
| 2 | 3.6E+20 | 4.1E+20 | 1.02 | 1.18 | 1.44 | 1.83 | 2.29E+14 | 85.3 |
| 3 | 4.5E+20 | 4.1E+20 | 1.02 | 1.04 | 1.39 | 1.80 | 2.29E+14 | 85.4 |
| 4 | 2.9E+20 | 6.5E+20 | 1.02 | 1.40 | 1.46 | 1.65 | 3.69E+14 | 84.3 |
| 5 | 2.9E+20 | 5.3E+20 | 1.02 | 1.45 | 1.55 | 1.72 | 2.99E+14 | 84.5 |
| 6 | 2.9E+20 | 2.9E+20 | 1.02 | 1.39 | 1.50 | 1.66 | 1.66E+14 | 86.6 |
| 7 | 4.5E+20 | 2.9E+20 | 1.03 | 1.43 | 1.63 | 1.72 | 1.66E+14 | 87.1 |
| 8 | 2.4E+20 | 3.4E+20 | 1.30 | 1.51 | 1.58 | 2.16 | 1.91E+14 | 86.2 |
| 9 | 3.4E+20 | 4.7E+20 | 1.02 | 1.25 | 1.34 | 1.44 | 2.67E+14 | 84.2 |
| 10 | 5.3E+20 | 7.6E+20 | 1.02 | 1.03 | 1.03 | 1.39 | 4.30E+14 | 83.9 |
| 11 | 6.0E+20 | 8.7E+20 | 1.02 | 1.02 | 1.02 | 1.06 | 4.92E+14 | 79.9 |

The volume (cm³) of the positive electrode mixture layer 223 can be obtained from the area Sa1 of the positive electrode sheet 810 in which the positive electrode mixture layer 223 is coated, and the thickness (ha−he) of the coated positive electrode mixture layer 223 (see FIG. 5).

<<Number of Lithium Ions Y0 Contained in Negative Electrode Mixture Layer 243>>

Herein, the "number of lithium ions Y0 contained in the negative electrode mixture layer 243" is the number of lithium ions in the electrolyte solution impregnated in the negative electrode mixture layer 243, assuming that the electrolyte solution is impregnated in the pores D of the negative electrode mixture layer 243, for example, as illustrated in FIG. 6. On the other hand, the foregoing "number of lithium ions Y of the negative electrode mixture layer 243" is the number of lithium ions in the electrolyte solution impregnated per 1 cm³ of the negative electrode mixture layer 243.

Here, the number of lithium ions Y0 of the negative electrode mixture layer 243 is calculated by the following equation:

(the number of lithium ions $Y0$ of the negative electrode mixture layer 243)=(the volumetric capacity $Vd$ of the pores $D$ in the negative electrode mixture layer 243)×(the lithium ion concentration $L$ (mol/L) of the electrolyte solution)× Avogadro's number (NA).

The number of lithium ions Y0 of the negative electrode mixture layer 243 may also be calculated by the following equation:

(the number of lithium ions $Y0$ of the negative electrode mixture layer 243)=(the volumetric capacity $Vd$ of the pores $D$ per 1 cm³ of the negative electrode mixture layer 243)×(the lithium ion concentration $L$ (mol/L) of the electrolyte solution)×Avogadro's number (NA)×(the volume (cm³) of the negative electrode mixture layer 243).

The foregoing number of lithium ions Y in the electrolyte solution impregnated per 1 cm³ of the negative electrode mixture layer 243 is obtained by the following equation:

(the number of lithium ions $Y$ in the electrolyte solution impregnated per 1 cm³ of the negative electrode mixture layer 243)=(the number of lithium ions $Y0$ of the negative electrode mixture layer 243)÷(the volume (cm³) of the negative electrode mixture layer 243).

The volume (cm³) of the negative electrode mixture layer 243 can be obtained from the area Sc1 of the negative electrode sheet 820 in which the negative electrode mixture layer 243 is coated, and the thickness (hc−hf) of the coated negative electrode mixture layer 243 (see FIG. 6).

<<Number of Lithium Ions in the Samples>>

As shown in Table 1, in sample 1, the number of lithium ions X0 of the positive electrode mixture layer 223 was 2.9E+20, and the number of lithium ions Y0 of the negative electrode mixture layer 243 was 4.1E+20.

In sample 2, the number of lithium ions X0 of the positive electrode mixture layer 223 was 3.6E+20, and the number of lithium ions Y0 of the negative electrode mixture layer 243 was 4.1E+20.

In sample 3, the number of lithium ions X0 of the positive electrode mixture layer 223 was 4.5E+20, and the number of lithium ions Y0 of the negative electrode mixture layer 243 was 4.1E+20.

In sample 4, the number of lithium ions X0 of the positive electrode mixture layer 223 was 2.9E+20, and the number of lithium ions Y0 of the negative electrode mixture layer 243 was 6.5E+20.

In sample 5, the number of lithium ions X0 of the positive electrode mixture layer 223 was 2.9E+20, and the number of lithium ions Y0 of the negative electrode mixture layer 243 was 5.3E+20.

In sample 6, the number of lithium ions X0 of the positive electrode mixture layer 223 was 2.9E+20, and the number of lithium ions Y0 of the negative electrode mixture layer 243 was 2.9E+20.

In sample 7, the number of lithium ions X0 of the positive electrode mixture layer 223 was 4.5E+20, and the number of lithium ions Y0 of the negative electrode mixture layer 243 was 2.9E+20.

In sample 8, the number of lithium ions X0 of the positive electrode mixture layer 223 was 2.4E+20, and the number of lithium ions Y0 of the negative electrode mixture layer 243 was 3.4E+20.

In sample 9, the number of lithium ions X0 of the positive electrode mixture layer 223 was 3.4E+20, and the number of lithium ions Y0 of the negative electrode mixture layer 243 was 4.7E+20.

In sample 10, the number of lithium ions X0 of the positive electrode mixture layer 223 was 5.3E+20, and the number of lithium ions Y0 of the negative electrode mixture layer 243 was 7.6E+20.

In sample 11, the number of lithium ions X0 of the positive electrode mixture layer 223 was 6.0E+20, and the number of lithium ions Y0 of the negative electrode mixture layer 243 was 8.7E+20.

<<Number of Consumed Lithium Ions Z>>

As shown in Table 1, when the charge-discharge rate is 15 C, the number of consumed lithium ions Z is approximately 2.81E+20. When the charge-discharge rate is 20 C, the number of consumed lithium ions Z is approximately 3.7E+20. When the charge-discharge rate is 25 C, the number of consumed lithium ions Z is approximately 4.7E+20. When the charge-discharge rate is 30 C, the number of consumed lithium ions Z is approximately 56E+20.

<<Measurement Results of Resistance Increase Rate>>

The measurement results of the resistance increase rates for the samples are as shown in Table 1. Note that the resistance increase rate varies depending on the charge-discharge rate. Table 1 discloses those in the cases of 15 C, 20 C, 25 C, and 30 C. In FIG. 10, the resistance increase rates for the case of 20 C are plotted by black triangles "▲".

The resistance increase rates for sample 1 were 1.02 at a charge-discharge rate of 15 C, 1.34 at a charge-discharge rate of 20 C, 1.46 at a charge-discharge rate of 25 C, and 1.97 at a charge-discharge rate of 30 C.

The resistance increase rates for sample 2 were 1.02 at a charge-discharge rate of 15 C, 1.18 at a charge-discharge rate of 20 C, 1.44 at a charge-discharge rate of 25 C, and 1.83 at a charge-discharge rate of 30 C.

The resistance increase rates for sample 3 were 1.02 at a charge-discharge rate of 15 C, 1.04 at a charge-discharge rate of 20 C, 1.39 at a charge-discharge rate of 25 C, and 1.80 at a charge-discharge rate of 30 C.

The resistance increase rates for sample 4 were 1.02 at a charge-discharge rate of 15 C, 1.40 at a charge-discharge rate of 20 C, 1.46 at a charge-discharge rate of 25 C, and 1.65 at a charge-discharge rate of 30 C.

The resistance increase rates for sample 5 were 1.02 at a charge-discharge rate of 15 C, 1.40 at a charge-discharge rate of 20 C, 1.55 at a charge-discharge rate of 25 C, and 1.72 at a charge-discharge rate of 30 C.

The resistance increase rates for sample 6 were 1.02 at a charge-discharge rate of 15 C, 1.39 at a charge-discharge rate of 20 C, 1.50 at a charge-discharge rate of 25 C, and 1.66 at a charge-discharge rate of 30 C.

The resistance increase rates for sample 7 were 1.03 at a charge-discharge rate of 15 C, 1.43 at a charge-discharge rate of 20 C, 1.63 at a charge-discharge rate of 25 C, and 1.72 at a charge-discharge rate of 30 C.

The resistance increase rates for sample 8 were 1.30 at a charge-discharge rate of 15 C, 1.51 at a charge-discharge rate of 20 C, 1.58 at a charge-discharge rate of 25 C, and 2.16 at a charge-discharge rate of 30 C.

The resistance increase rates for sample 9 were 1.02 at a charge-discharge rate of 15 C, 1.25 at a charge-discharge rate of 20 C, 1.34 at a charge-discharge rate of 25 C, and 1.44 at a charge-discharge rate of 30 C.

The resistance increase rates for sample 10 were 1.02 at a charge-discharge rate of 15 C, 1.03 at a charge-discharge rate of 20 C, 1.03 at a charge-discharge rate of 25 C, and 1.39 at a charge-discharge rate of 30 C.

The resistance increase rates for sample 11 were 1.02 at a charge-discharge rate of 15 C, 1.02 at a charge-discharge rate of 20 C, 1.04 at a charge-discharge rate of 25 C, and 1.06 at a charge-discharge rate of 30 C.

As shown in Table 1, when the number of lithium ions X0 of the positive electrode mixture layer 223 and the number of lithium ions Y0 of the negative electrode mixture layer 243 are greater than, or substantially equal to or greater than, the number of consumed lithium ions Z that are consumed for charge and discharge, the resistance increase rate tends to be kept low. Conversely, when either one of the number of lithium ions X0 of the positive electrode mixture layer 223 or the number of lithium ions Y0 of the negative electrode mixture layer 243 is less than the number of consumed lithium ions Z that are consumed for charge and discharge, the resistance increase rate is not kept low (i.e., the resistance increase rate tends to be considerably high).

<<Sample 1>>

For example, the evaluation test battery 800 of sample 1 shows that in the case where the charge-discharge rate is 15 C the number of lithium ions X0 of the positive electrode mixture layer 223 and the number of lithium ions Y0 of the negative electrode mixture layer 243 are greater than the number of consumed lithium ions Z that are consumed for charge and discharge. In this case, the resistance increase rate is kept low, 1.02. On the other hand, in the cases where the charge-discharge rates are 20 C, 25 C, and 30 C, either one of the number of lithium ions X0 of the positive electrode mixture layer 223 or the number of lithium ions Y0 of the negative electrode mixture layer 243 is less than the number of consumed lithium ions Z that are consumed for charge and discharge. In these cases, the resistance increase rates exceed 1.3, so the resistance increase rates are not kept low.

That is, in sample 1, the number of lithium ions X0 of the positive electrode mixture layer 223 is approximately 2.9E+20, and the number of lithium ions Y0 of the negative electrode mixture layer 243 is approximately 4.1E+20. In contrast, in the case where the charge-discharge rate is 15 C, the number of consumed lithium ions Z is approximately 2.81E+20. Thus, in the case where the charge-discharge rate is 15 C, the number of lithium ions X0 of the positive electrode mixture layer 223 and the number of lithium ions Y0 of the negative electrode mixture layer 243 are greater than the number of consumed lithium ions Z. For this reason, it is believed that the resistance increase rate is kept low, 1.02. On the other hand, in the cases where the charge-discharge rates are 20 C, 25 C, and 30 C, the numbers Z of consumed lithium ions are greater, so the number of lithium ions X0 of the positive electrode mixture layer 223 or the number of lithium ions Y0 of the negative electrode mixture layer 243 is less than the number of consumed lithium ions Z. For this reason, it is believed that the resistance increase rate becomes considerably high.

<<Sample 3>>

In addition, for example, the evaluation test battery 800 of sample 3 shows that in the case where the charge-discharge rate is 15 C, the resistance increase rate is kept low, 1.02. Moreover, in the case where the charge-discharge rate is 20 C, the resistance increase rate is kept low, 1.04. However, in the cases where the charge-discharge rates are 25 C and 30 C, the respective resistance increase rates exceeds 1.3.

That is, in sample 3, the number of lithium ions X0 of the positive electrode mixture layer 223 is approximately 4.5E+20. In addition, the number of lithium ions Y0 of the negative electrode mixture layer 243 is approximately 4.1E+20. In contrast, in the case where the charge-discharge rate is 15 C, the number of consumed lithium ions Z is approximately 2.81E+20. Moreover, in the case where the charge-discharge rate is 20 C, the number of consumed lithium ions Z is approximately 3.7E+20. Thus, in the cases where the charge-discharge rate is 15 C or 20 C, the number of lithium ions X0 of the positive electrode mixture layer 223 and the number of lithium ions Y0 of the negative electrode mixture layer 243 are greater than the number of consumed lithium ions Z. For this reason, it is believed that the resistance increase rate is kept low. On the other hand, in the cases where the charge-discharge rates are 25 C and 30 C, the numbers Z of consumed lithium ions are greater, so the number of lithium ions X0 of the positive electrode mixture layer 223 or the number of lithium ions Y0 of the negative electrode mixture layer 243 is less n the number of consumed lithium ions Z. For this reason, it is believed that the tendency of increasing the resistance increase rate becomes noticeable.

<<Evaluation of Lithium-Ion Secondary Battery 100>>

Thus, for the lithium-ion secondary battery 100 that is suitable for the applications in which the charge-discharge rate is especially high, it is desirable that the number of lithium ions X0 of the positive electrode mixture layer 223 and the number of lithium ions Y0 of the negative electrode mixture layer 243 be greater than the number of consumed lithium ions Z. It should be noted, however, that the number of consumed lithium ions Z varies depending on the use condition of the battery.

For this reason, it is preferable that the lithium-ion secondary battery 100 be evaluated using the number of lithium ions X in the electrolyte solution impregnated per 1 $cm^3$ of the positive electrode mixture layer 223 and the number of lithium ions Y in the electrolyte solution impregnated per 1 $cm^3$ of the negative electrode mixture layer 243. It is believed that in the lithium-ion secondary battery 100, the greater the number of lithium ions X in the electrolyte solution impregnated per 1 $cm^3$ of the positive electrode mixture layer 223 or the number of lithium ions Y in the electrolyte solution impregnated per 1 $cm^3$ of the negative electrode mixture layer 243, the more difficult it is for the resistance increase rate to become higher.

In particular, in the applications in which the charge-discharge rate is high, for example, in the battery for hybrid electric vehicles, it is desirable that the resistance increase rate should not rise even in use conditions in which charge-discharge: rate is high. Moreover, in some cases, the vehicles are used even in cold climate regions, and the rate controlling factor of lithium ion for the reactions in the battery decreases especially in an environment at, for example, 30° C., so in some cases, the battery may not be applicable to the applications in which the charge-discharge rate is high.

In the lithium-ion secondary battery 100 according to one embodiment of the present invention, the above-described number of lithium ions X and the above-described number of lithium ions Y are both $3.75 \times 10^{19}$ or greater. In the just-mentioned lithium-ion secondary battery 100, the number of lithium ions X in the positive electrode mixture layer 223 and the number of lithium ions Y in the negative electrode mixture layer are both $3.75 \times 10^{19}$ or greater. Therefore, the lithium ions that are absorbed in or released from the positive electrode mixture layer 223 and the negative electrode mixture layer 243 during charge and discharge can be supplied to some degree by the lithium ions contained in the positive electrode mixture layer 223 and the lithium ions contained in the negative electrode mixture layer 243.

In the just-described lithium-ion secondary battery 100, the resistance increase rate of the lithium-ion secondary battery 100 can be kept low even in the applications in which the number of consumed lithium ions Z is high (in other words, in the applications in which the charge-discharge rate is high). Moreover, the number of lithium ions X and the number of lithium ions Y that are required for the charge-discharge rate are ensured in the positive electrode mixture layer 223 and the negative electrode mixture layer 243, respectively.

Figure 11:
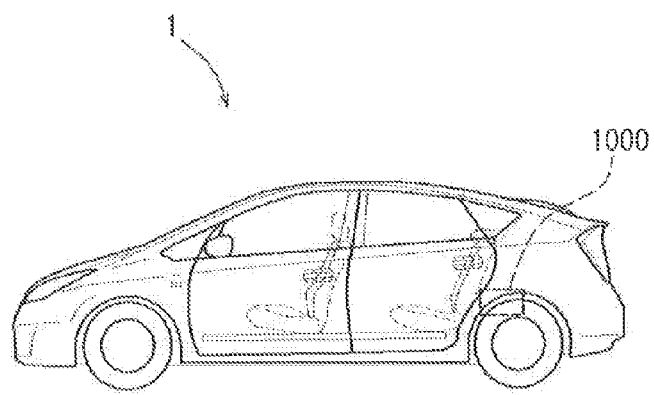
FIG. 11 is a view illustrating an example of a vehicle incorporating a vehicle drive battery.

Particularly in a low-temperature environment at about $-30°$ C., the rate controlling factor for the reaction in which lithium ions are absorbed in and released from the positive electrode mixture layer 223 and the negative electrode mixture layer 243 during charge and discharge decreases considerably. This lithium-ion secondary battery 100 can suppress the deterioration of the output power characteristics particularly even in such a low-temperature environment. Therefore, the lithium-ion secondary battery 100 is suitable for a vehicle drive battery 1000 incorporated in a vehicle 1 that is used in cold climate regions, as illustrated in FIG. 11.

Furthermore, from such findings, it is believed that the greater the number of lithium ions X and the number of lithium ions Y are, the more difficult it is for the resistance increase rate of the lithium-ion secondary battery 100 to increase in the applications in which the number of consumed lithium ions Z is high (i.e., in the applications in which the charge-discharge rate is high). Therefore, in the applications in which the number of consumed lithium ions Z is high (i.e., in the applications in which the charge-discharge rate is high), it is preferable that the number of lithium ions X and the number of lithium ions Y be both greater than $175 \times 10^{19}$, more preferably greater than $9.00 \times 10^{19}$ in order to keep the resistance increase rate low.

<<Capacity Retention Ratio>>

As another point of view, the influence on the capacity retention ratio of the lithium-ion secondary battery 100 will be discussed. Herein, as an evaluation test for evaluating the capacity retention ratio (in other words, the storage performance), the above-described evaluation test batteries 800 was set aside for 60 days in a temperature environment at 60° from the condition of 80% SOC, and the ratio of the retained battery capacity (capacity retention ratio (%)) was measured. The capacity retention ratio (%) here is the value obtained by dividing the battery capacity after setting the battery aside for 60 days by the battery capacity before setting the battery aside for 60 days.

Herein the capacity retention ratio (%) was obtained as follows. Under a temperature condition of 25° C., the SOC of the batteries was adjusted to 80% by CCCV charging in which the batteries were charged with a constant current of 1 C to 4.1 V and thereafter charged with a constant voltage until the total charge time reached 3 hours. These batteries were stored under an environment at 60° C. for 60 days. Thereafter, they were discharged under a temperature condition of 25° C. under the same conditions as those in the initial capacity measurement, and the battery capacity at this point (post high-temperature storage battery capacity Q2) was obtained. Then, the capacity retention ratio was calculated by the following expression: $Q2/Q1 \times 100 [\%]$.

<<Initial Capacity Measurement>>

The measurement of initial capacity was carried out as follows. For example, under a temperature condition of 25° C., the batteries were charged with a constant current of 1 C (0.2 A herein) until the terminal voltage became 4.1 V, and subsequently charged with a constant voltage until the total charge time reached 2.5 hours (CC-CV charging). After the batteries were rested for 10 minutes from the completion of the charging, the batteries were discharged at 25° C. from 4.1 V to 3.0 V with a constant current of 0.33 C and subsequently discharged with a constant voltage until the total discharge time reached 4 hours. The discharge capacity at that time was determined as the initial capacity Q1 [Ah] for each of the batteries.

As a result, the capacity retention ratio was approximately 80% or higher for each of the foregoing samples 1 to 10. However, sample 11 showed a capacity retention ratio of less than 80%. One of the reasons is believed to be that the number of lithium ions Y0 of the negative electrode mixture layer 243 is high. That is, in the above-described lithium-ion secondary battery 100, an SEI (solid electrolyte interphase or solid electrolyte interface) film, which is a reaction product of lithium ions with the electrolyte solution or the like, may be formed on the surface of the negative electrode active material, and on the negative electrode mixture layer 243.

When the SEI film is formed on the surface of the negative electrode active material, part of the lithium ions in the electrolyte solution is irreversibly absorbed in the SEE film as a consequence. The lithium ions absorbed irreversibly in this way are no longer directly involved in the subsequent charge-discharge process. As for sample 11, one of the reasons for the decrease of the capacity retention ratio is believed to be that a greater number of the lithium ions in the electrolyte solution is absorbed in the SEI film.

<<Number of Lithium Ions Y1 Per Unit Weight of Negative Electrode Active Material>>

For that reason, the number of lithium ions Y1 per unit weight of the negative electrode active material was studied. The number of lithium ions Y1 per unit weight of the negative electrode active material is the number of lithium ions per unit weight of negative electrode active material 710 contained in the negative electrode mixture layer 243 when the electrolyte solution is sufficiently impregnated in the negative electrode mixture layer 243 (see FIG. 6). The just-mentioned number of lithium ions Y1 can be obtained by, for example, dividing the foregoing number of lithium ions Y in the electrolyte solution impregnated per 1 cm$^3$ of the negative electrode mixture layer 243 by the weight (g) of the negative electrode active material 710 contained per 1 cm$^3$ of the negative electrode mixture layer 243.

The just-described number of lithium ions Y1 per unit weight of the negative electrode active material 710 is correlated to the decrease of the capacity retention ratio to some degree, as shown in Table 1. It is observed that the greater the number of lithium ions Y1 per unit weight of the negative electrode active material 710, the lower the capacity retention ratio tends to become. Herein, when the number of lithium ions Y1 contained per unit weight (e.g., 1 g) of the negative electrode active material 710 in the negative electrode mixture layer 243 is approximately $4.3 \times 10^{14}$ or less, the decrease of the capacity retention ratio is kept low to some degree.

<<Resistance Increase Rate of Lithium-ion Secondary Battery 100>>

As discussed above, it is preferable that in the lithium-ion secondary battery 100, the number of lithium ions X in the electrolyte solution impregnated per 1 cm$^3$ of the positive electrode mixture layer 223 and the number of lithium ions Y in the electrolyte solution impregnated per 1 cm$^3$ of the negative electrode mixture layer 243 are both $3.75 \times 10^{19}$ or greater (see FIG. 1). This allows the resistance increase rate of the lithium-ion secondary battery 100 to be kept small, and makes it possible to provide a lithium-ion secondary battery 100 that can maintain appropriate output power performance particularly even in such a use environment in which the battery is used at a high charge-discharge rate in a low-temperature environment.

<<Capacity Retention Ratio of Lithium-Ion Secondary Battery 100>>

Moreover, in the above-described lithium-ion secondary battery 100 when the number of lithium ions Y1 contained per unit weight (e.g., 1 g) of the negative electrode active material in the negative electrode mixture layer 243 is approximately $4.3 \times 10^{14}$ or less, the decrease of the capacity retention ratio can be kept low to some degree.

In the above-described lithium-ion secondary battery 100, the number of lithium ions X of the positive electrode mixture layer 223 can be adjusted by the relationship between the proportion (porosity) of the pores B formed in the positive electrode mixture layer 223 and the lithium ion concentration of the electrolyte solution. Likewise, the number of lithium ions Y of the negative electrode mixture layer 243 can be adjusted by the relationship between the proportion (porosity) of the pores D formed in the negative electrode mixture layer 243 and the lithium ion concentration of the electrolyte solution. That is, the number of lithium ions X of the positive electrode mixture layer 223 can be increased by increasing the porosity of the positive electrode mixture layer 223 and making the lithium ion concentration of the electrolyte solution higher. Likewise, the number of lithium ions Y of the negative electrode mixture layer 243 can be increased by increasing the porosity of the negative electrode mixture layer 243 and making the lithium ion concentration of the electrolyte solution higher.

It should be noted that when the lithium ion concentration of the electrolyte solution is made higher, the viscosity of the electrolyte solution becomes higher, so it becomes more difficult to impregnate the electrolyte solution into the positive electrode mixture layer 223 and the negative electrode mixture layer 243. Consequently, even when the proportions of the pores D of the positive electrode mixture layer 223 and the negative electrode mixture layer 243 are made higher and also the lithium ion concentration in the electrolyte solution is made higher, there may be a case in which the electrolyte solution may not be impregnated sufficiently in the pores B and D of the positive electrode mixture layer 223 and the negative electrode mixture layer 243. In such a case, the number of lithium ions X and the number of lithium ions Y become small. If the number of lithium ions X and the number of lithium ions Y become small, the advantageous effect such as described above cannot be obtained, and the resistance increase rate of the lithium-ion secondary battery 100 cannot be kept small.

<<In the Case where the Viscosity of the Electrolyte Solution is High>>

For this reason, in the case where the viscosity of the electrolyte solution is high to some degree (in other words, in the case where the lithium ion concentration of the electrolyte solution is made higher), it is preferable that the electrolyte solution be filled by repeating pressurization and depressurization when filling the electrolyte solution. This allows the positive electrode mixture layer 223 and the negative electrode mixture layer 243 to be impregnated with a greater amount of the electrolyte solution. When the concentration of the electrolyte solution is made higher by making the lithium ion concentration of the electrolyte solution higher, it is preferable that the electrolyte solution be filled by repeating pressurization and depressurization a greater number of times. It is preferable that when the lithium ion concentration exceeds, for example, 1.2 mol/L the number of times of repeating the pressurization and depressurization be set at, for example, 5 times or greater, more preferably 6 times or greater. Here, pressurization means increasing the pressure in the battery case 300, and depressurization means decreasing the pressure in the battery case 300. The pressurization and depressurize may be carried out, for example, by connecting a pump to the battery case 300.

<<Weight Ratio A3 of Conductive material 620 to Positive Electrode Active Material 610>>

As described above, it is preferable that the proportion (porosity) of the pores B formed in the positive electrode mixture layer 223 be increased in order to increase the number of lithium ions X of the positive electrode mixture layer 223 to some degree. In this case, it is preferable that the density of the positive electrode mixture layer 223 be lowered. When the density A1 of the positive electrode mixture layer 223 is lowered, the conductivity of the positive electrode mixture layer 223 may decrease in some cases. For this reason, it is preferable that the proportion of the conductive material 620 be made higher. For example, it is preferable that the weight ratio A3 of the conductive material 620 to the positive electrode active material 610 in the positive electrode mixture layer 223 be set at from about 14% to about 19%. Here, the weight ratio A3 is represented as Weight ratio $A3$=(the weight of the conductive material 620 in the positive electrode mixture layer 223)/(the weight of the positive electrode active material 610 in the positive electrode mixture layer 223).

<<Dispersion of Conductive Material 620>>

When the weight ratio A3 of the conductive material 620 to the positive electrode active material 610 in the positive electrode mixture layer 223 is made larger, it is preferable that the positive electrode active material 610 and the conductive material 620 should be mixed together at a predetermined ratio, and thereafter a solvent should be added little by little to reduce the concentration of the solid content gradually in preparing the positive electrode mixture. In this case, it is preferable that a predetermined concentration of the solid content be obtained while adding the solvent and then stirring mixture once so that the concentration of the solid content lowers, for example, 1% by 1% from about 60%. Thereby, the positive electrode active material 610 and the conductive material 620 are appropriately mixed together in the positive electrode mixture, so that the conductive material 620 can be appropriately dispersed in the positive electrode mixture.

According to the knowledge of the present inventors, the direct current resistance also can vary by, for example, how the concentration of the solid content of the positive electrode mixture is adjusted in preparing the positive electrode mixture. For example, the direct current resistance of the lithium-ion secondary battery 100 can be improved more preferably in the case where the predetermined concentration of the solid content is obtained by adding the solvent and then stirring the mixture in such a manner that the concentration of the solid content is lowered 1% by 1% from about 60% than in the case where the predetermined concentration of the solid content is obtained by adding the solvent and then stirring the mixture in such a manner that the concentration of the solid content is lowered 4% by 4% from about 60%. More specifically, the direct current resistance can vary how the concentration of the solid content of the positive electrode mixture is adjusted in preparing the positive electrode mixture even in the case where the weight ratio A3 of the conductive material 620 to the positive electrode active material 610 in the positive electrode mixture layer 223 is set to be substantially the same, at 14% or higher, and the density of the positive electrode mixture layer 223 is set to be substantially the same (for example, at 13 g/cm$^3$). When preparing the positive electrode mixture, the direct current resistance of the lithium-ion secondary battery 100 can be improved more preferably when a small amount of the solvent is added and then the positive electrode mixture is stirred to bring the concentration of the solid content closer to a predetermined concentration in such a manner that the concentration of the solid content of the positive electrode mixture can be lowered little by little (for example, 1% by 1%) from about 60%.

In the step of stirring the positive electrode active material 610, the conductive material 620, and the solvent, a Filmics-type mixer may be used, for example. For example, a Filmics made by Primix Corp. may be used as the Filmics-type mixer.

<<Density A1 of Positive Electrode Mixture Layer 223>>

In the above-described lithium-ion secondary battery 100, it is desirable to make the proportion of the pores B of the positive electrode mixture layer 223 higher. For this reason, it is desirable that the density A1 of the positive electrode mixture layer 223 be lower. It is preferable that the density A1 of the positive electrode mixture layer 223 be A1≤2.1 g/cm$^3$, more preferably A1≤1.9 g/cm$^3$. By setting the density A1 of the positive electrode mixture layer 223 to be A1≤1.9 g/cm$^3$, the number of lithium ions X of the positive electrode mixture layer 223 can be made greater. Furthermore, by setting the density A1 of the positive electrode mixture layer 223 to be A1≤1.9 g/cm$^3$, the number of lithium ions X of the positive electrode mixture layer 223 can be made even greater. From another point of view, it is preferable that the proportion (porosity) of the pores B of the positive electrode mixture layer 223 be set at 40 or greater.

Furthermore, the above-described lithium-ion secondary battery 100 has a large number of lithium ions X of the positive electrode mixture layer 223, and in order to achieve this, it is more preferable for the positive electrode mixture layer 223 to have more pores B. This means that the density A1 of the positive electrode mixture layer 223 tends to be lower. As discussed previously, in the positive electrode mixture layer 223, electric charge is transferred between the positive electrode active material 610 and the positive electrode current collector 221 through the conductive material 620. In this case, when the density A1 of the positive electrode mixture layer 223 is low, the positive electrode mixture layer 223 simply has more pores B. For this reason, the proportion of the conductive material 620 needs to be made higher. However, for the purposes of weight reduction and size reduction, it is desirable that the amount (weight) of the conductive material 620 used should be made low to some degree.

<<Bulk Density A2 of Conductive Material 223>>

For that reason, in this embodiment, one having a somewhat small bulk density A2 was selected and used as the conductive material 620 of the positive electrode mixture layer 223. Thereby, the transfer path of electric charge between the positive electrode active material 610 and the positive electrode current collector 221 can be formed more appropriately while at the same time the amount (weight) of the conductive material 620 used is kept even lower. In addition, when the bulk density A2 of the conductive material 620 is small to some degree, the apparent volume of the conductive material 620 is relatively great although the weight of the conductive material 620 is light. For this reason, the transfer path of electric charge can be formed more appropriately with a conductive material 620 having a smaller hulk density A2, even when the amount of the conductive material used is the same in the evaluation in terms of weight.

From such a viewpoint, it is preferable that the bulk density A2 of the conductive material 620 in the positive electrode mixture layer 223 be, for example, A2≤0.04 g/cm$^{-3}$. When the bulk density A2 of the conductive material 620 is A2≤0.04 g/cm$^3$, it is more likely that the transfer path of electric charge can be formed more appropriately between the positive electrode active material 610 and the positive electrode current collector 221. In addition, by selecting and using a conductive material 620 having a somewhat small bulk density A2 in this way, the transfer path of electric charge can be formed more appropriately even when the density of the positive electrode mixture layer 223 is made lower. Moreover, the amount of the conductive material 620 used can be further reduced, and the weight of the lithium-ion secondary battery 100 can be reduced. More preferably, the hulk density A2 of the conductive material 620 in the positive electrode mixture layer 223 may be, for example, A2≤0.03 g/cm$^3$.

As described previously, in the lithium-ion secondary battery 100 according to one embodiment of the present invention, the number of lithium ions X in the electrolyte solution impregnated per 1 cm$^3$ of the positive electrode mixture layer 223 and the number of lithium ions Y in the electrolyte solution impregnated per 1 cm$^3$ of the negative electrode mixture layer 243 are both 175×10$^{19}$ or greater. In a preferred embodiment of the just-described lithium-ion secondary battery 100, the density A1 of the positive electrode mixture layer 223 may be approximately 1.9 g/cm$^3$ or less (A1≤1.9 g/cm$^3$). Moreover, it is preferable to select and use a conductive material 620 in the positive electrode mixture layer 223 having a bulk density A2 of 0.04 g/cm$^3$ or less (A2≤0.04 g/cm$^3$).

Thus, when the density A1 of the positive electrode mixture layer 223 is set at 1.9 g/cm$^3$ or less, a large number of pores B can exist in the positive electrode mixture layer 223, and therefore, the number of lithium ions X of the positive electrode mixture layer 223 is large. Furthermore, because the bulk density A2 of the conductive material 620 is A2≤0.04 g/cm$^3$, the transfer path of electric charge can be formed more appropriately in the positive electrode mixture layer 223. This makes it possible to lower the direct current resistance of the lithium-ion secondary battery 100 considerably. Moreover, in this case, the weight ratio A3 of the conductive material 620 the positive electrode active material 610 may be 11% or lower, and even at about 7%, the transfer path of electric charge can be formed more appropriately in the positive electrode mixture layer 223.

From another point of view, in a preferred embodiment of the lithium-ion secondary battery 100, it is possible that the proportion (porosity) of the pores B of the positive electrode mixture layer 223 may be set at 40 or greater. In this case as well, it is preferable to select and use one having a hulk density A2≤0.04 g/cm$^3$. In such a lithium-ion secondary battery 100, the pores B can exist in the positive electrode mixture layer 223. For this reason, the number of lithium ions X of the positive electrode mixture layer 223 is large. Furthermore, since the bulk density A2 of the conductive material 620 is A2≤0.04 g/cm$^3$, the transfer path of electric charge can be formed more appropriately in the positive electrode mixture layer 223. This makes it possible to lower the direct current resistance of the lithium-ion secondary battery 100 considerably. In this case, the weight ratio A3 of the conductive material 620 the positive electrode active material 610 may be 11% or lower, and even at about 7%, the transfer path of electric charge can be formed more appropriately in the positive electrode mixture layer 223.

The present inventors prepared a plurality of evaluation test batteries 800 (see FIG. 9) that are varied in the density A1 of the positive electrode mixture layer 223 (see FIG. 5), the bulk density A2 of the conductive material 620 in the positive electrode mixture layer 223, and the weight ratio A3 of the conductive material 620 to the positive electrode active material 610 in the positive electrode mixture layer 223. The evaluation test batteries 800 had the same conditions, except for the density A1 of the positive electrode mixture layer 223, the bulk density A2 of the conductive material 620, and the weight ratio A3 of the conductive material 620 to the positive electrode active material 610. For each of the evaluation test batteries 800, the direct current resistance (I-V resistance) (mΩ) was measured. The results of the text are shown in FIGS. 12 and 13.

For the evaluation test batteries 800 prepared here, the densities A1 of the positive electrode mixture layer 223 are 13 g/cm$^3$, 1.9 g/cm$^3$, 2.1 g/cm$^3$, and 2.3 g/cm$^3$. The bulk densities A2 of the conductive material. 620 are 0.04 g/cm$^3$ and 0.15 g/cm$^3$. Furthermore, the weight ratios A3 of the conductive material 620 to the positive electrode active material 610 are 4%, 7%, and 9%. FIG. 13 shows the weight ratio A3 of the conductive material 620 to the positive electrode active material 610 (the weight of the conductive material 620/the weight of the positive electrode active material 610) regarding the case where the density A1 of the positive electrode mixture layer 223 is 13 g/cm$^3$. In FIG. 12, each of the numerical values next to the respective one of the plots represents the weight ratio A3 of the conductive material 620 to the positive electrode active material 610. The black plots in FIG. 12 and the black triangles "▲" in FIG. 13 represent the direct current resistance values of the evaluation test batteries 800 in which the hulk density A2 of the conductive material 620 is 0.04 g/cm$^3$. The white plots in FIG. 12 and black diamond-shaped plots "◆" in FIG. 13 represent the direct current resistance values of the evaluation test batteries 800 in which the bulk density A2 of the conductive material 620 is 0.15 g/cm$^3$.

Figure 12:
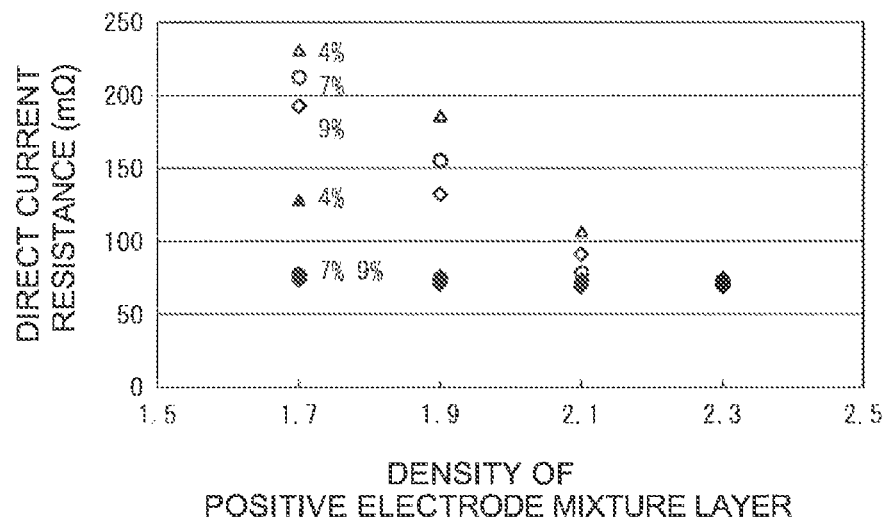
FIG. 12 is a graph illustrating test results for lithium-ion secondary batteries according to one embodiment of the present invention.
Figure 13:
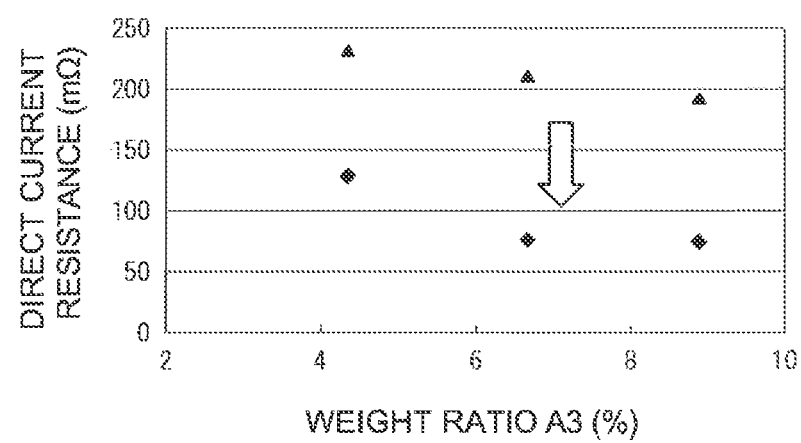
FIG. 13 is a graph illustrating test results for lithium-ion secondary batteries according to one embodiment of the present invention.

In this case, as shown in FIG. 12, as the density A1 of the positive electrode mixture layer 223 decreases from 2.3 g/cm$^3$ to 2.1 g/cm$^3$ to 1.9 g/cm$^3$ to 1.7 g/cm$^3$, the direct current resistance (I-V resistance) of the lithium-ion secondary battery 100 increases. In addition, in the case where the density A1 of the positive electrode mixture layer 223 is small, the direct current resistance (I-V resistance) of the lithium-ion secondary battery 100 tends to be higher as the weight ratio A3 of the conductive material 620 to the positive electrode active material 610 is smaller. Moreover, as shown in FIG. 13, when the density A1 of the positive electrode mixture layer 223 is 13 g/cm$^3$, the direct current resistance of the lithium-ion secondary battery 100 tends to be lower as the bulk density A2 of the conductive material 620 is lower.

From these, it is desirable that the density A1 of the positive electrode mixture layer 223 and the bulk density A2 of the conductive material 620 should be small to some degree, and in this case, it is desirable that the weight ratio A3 of the conductive material 620 to the positive electrode active material 610 be set in an appropriate range. According to the knowledge of the present inventors, it is preferable that the weight ratio A3 of the conductive material 620 to the positive electrode active material 610 be, for example, about 7% or greater in the case where, for example, the density A1 of the positive electrode mixture layer is A1≤1.9 g/cm$^3$ and the bulk density A2 of the conductive material 620 is A2≤0.04 g/cm$^3$. From the viewpoint of suppressing the amount of the conductive material 620 used appropriately, it is preferable that the weight ratio A3 of the conductive material 620 to the positive electrode active material 610 be about 11% or less. In this case, the lower limit of the weight ratio A3 of the conductive material 620 the positive electrode active material 610 is not limited to 7%, and may be at a level such that the transfer path of electric charge can be more appropriately formed in the positive electrode mixture layer 223, which may be 6% or 5%.

<<Power Supply System 2000>>

Next, a power supply system according to one embodiment of the present invention will be described.

Figure 14:
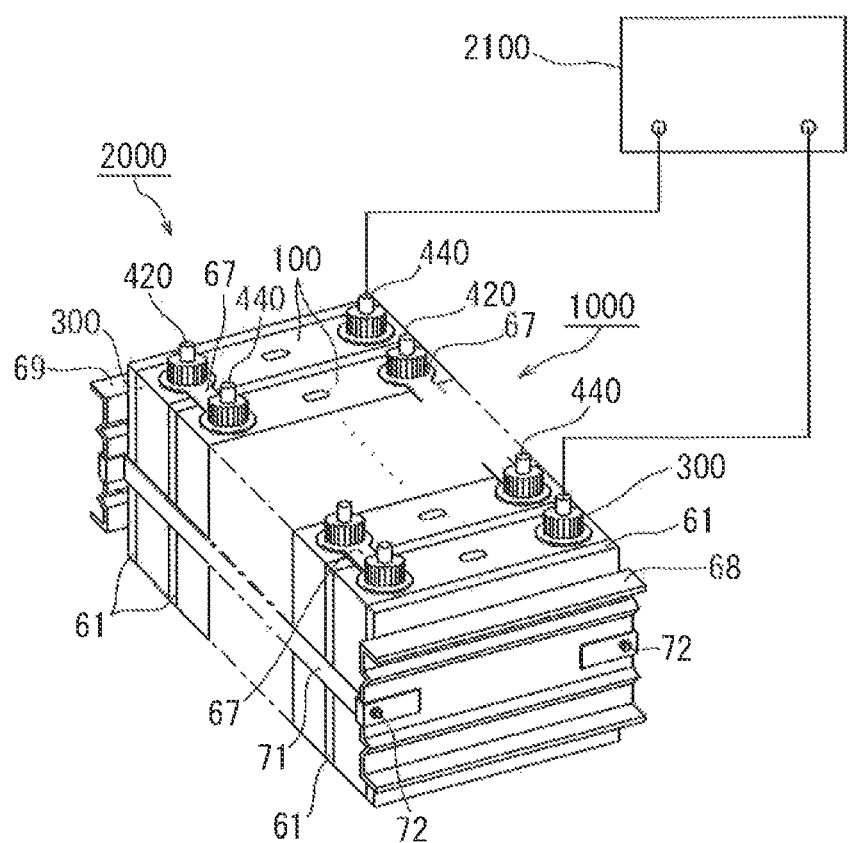
FIG. 14 is a view illustrating a power supply system according to one embodiment of the present invention.

FIG. 14 illustrates a power supply system 2000 according to one embodiment of the present invention. The power supply system 2000 includes a battery module 1000 as a secondary battery, and a battery control unit 2100. Here, the battery module 1000 has a plurality of lithium-ion secondary batteries 100 according to one embodiment of the present invention.

<<Battery Module 1000>>

The just-described battery module 1000 is constructed using a plurality of (typically 10 or more, preferably about from 10 to 30, for example, 20) lithium-ion secondary batteries 100. These lithium-ion secondary batteries 100 (cells) are arrayed one by one, each facing opposite directions so that positive electrode terminals 420 and negative electrode terminals 440 of the cells are alternately disposed next to each other and that the wide faces of the battery case 300 (see FIG. 1) of the cells face each other. Cooling plates 61 in a predetermined shape are disposed on both arrayed direction-wise (stacking direction-wise) outer sides of each cell so as to be in close contact with the wide faces of the battery case 300. A pair of end plates 68 and 69 are disposed further outward of the cooling plates 61. In this way, the entire module (hereinafter also referred to as a "constrained body") including the cell group and the end plates 68 and 69 arrayed in a stacking direction of the cells 100 is constrained by constraining belts 71 for clamping, which are attached across the two end plates 68 and 69, at a predetermined confining pressure P in a stacking direction of the constrained body. More specifically, the ends of the constraining belt 71 are screw-fastened to the end plates 68 and 69 by screws 72, whereby a predetermined confining pressure P is applied to the constrained body in the stacking direction. In the two adjacent lithium-ion secondary batteries 100 within this battery module 1000, the positive electrode terminal 420 of one cell and the negative electrode terminal 440 of the other cell are electrically connected to each other by a connector 67. The battery module 1000 with a desired voltage is constructed by connecting the cells 20 in series in this manner.

<<Battery Control Unit 2100>>

As illustrated in FIG. 14, a battery control unit 2100 is connected to the battery module 1000 as a secondary battery. In this embodiment, the battery control unit 2100 is connected to the positive electrode terminal 420 of one end of the lithium-ion secondary batteries 100 of the battery module 1000 and the negative electrode terminal 440 of the other end of the lithium-ion secondary batteries 100 thereof. The battery control unit has the function to determine an upper limit value W of the amount of consumed electric charge per unit time during discharge of the battery module 1000.

In this power supply system 2000, the above-described lithium-ion secondary batteries 100 are selected according to the upper limit value W of the amount of consumed electric charge per unit time during discharge of the battery module 1000, which is determined by the battery control unit 2100.

That is, in this embodiment, the battery module 1000 uses, in combination, a plurality of lithium-ion secondary batteries 100, each according to one embodiment of the present invention. The lithium-ion secondary battery 100 has, as illustrated in FIG. 1, a positive electrode current collector 221 and a positive electrode mixture layer 223 coated on the positive electrode current collector 221 and containing at least a positive electrode active material 610 (see FIG. 5) and a conductive material 620. In addition, the lithium-ion secondary battery 100 has a negative electrode current collector 241 and a negative electrode mixture layer 100 coated on the negative electrode current collector 241 and containing at least a negative electrode active material 710 (see FIG. 6). An electrolyte solution containing lithium ions at a predetermined concentration is filled in the battery case 300. Here, the positive electrode mixture layer 223 has pores B in which the electrolyte solution is impregnated, and the negative electrode mixture layer 243 has pores C in which the electrolyte solution is impregnated.

In this embodiment, the number of lithium ions X in the electrolyte solution impregnated per 1 $cm^3$ of the positive electrode mixture layer 223 and the number of lithium ions Y in the electrolyte solution impregnated per 1 $cm^3$ of the negative electrode mixture layer 243 are both equal to or greater than the number of consumed lithium ions Zx per 1 $cm^3$ of the positive electrode mixture layer 223. Here, the number of consumed lithium ions Zx is obtained by the following equation: Zx={(the upper limit value W of the amount of consumed electric charge/elementary charge)/the volume of the positive electrode mixture layer)}.

In other words, the number of consumed lithium ions Zx can be obtained as the number of lithium ions that are consumed per 1 $cm^3$ of the positive electrode mixture layer 223 of one of the lithium-ion secondary batteries in the battery module 1000 during charge and discharge. In this embodiment, it can be obtained by dividing the upper limit value W of the amount of consumed electric charge per unit time during discharge of the battery module 1000, which is determined by the battery control unit 2100, by the elementary charge and further by the total sum of the volumes of the total sum of the volumes of the positive electrode mixture layers 223 of the lithium-ion secondary batteries 100 in the battery module 1000.

That is, in the case of the battery module 1000, the battery module 1000 can also be considered as a single secondary battery. More specifically, in the case of the battery module 1000, "the volume of the positive electrode mixture layer" in the equation the number of consumed lithium ions Zx={(the upper limit value W of the amount of consumed electric charge/elementary charge)/the volume of the positive electrode mixture layer} may be replaced with "the total sum of the volumes of the positive electrode mixture layers 223 of the lithium-ion secondary batteries 100 in the battery module 1000".

In the power supply system 2000, the number of lithium ions X of the positive electrode and the number of lithium ions Y of the negative electrode are both equal to or greater than the number of consumed lithium ions Zx. Thus, the power supply system 2000 is provided with the lithium-ion secondary battery 100 that have an appropriate number of lithium ions X of the positive electrode and an appropriate number of lithium ions Y of the negative electrode, in relation to the upper limit value W of the amount of consumed electric charge per unit time during discharge of the battery module 1000, which is determined by the battery control unit 2100.

In such a power supply system 2000, appropriate amounts of lithium ions are ensured for the positive electrode mixture layer 223 and the negative electrode mixture layer 243 in each of the lithium-ion secondary batteries 100, within the range controlled by the battery control unit 2100. Therefore, within the range controlled by the battery control unit 2100, the resistance increase rate of each of the lithium-ion secondary batteries 100 can be suppressed. Moreover, the number of lithium ions X and the number of lithium ions Y that are required for the charge-discharge rate are ensured in the positive electrode mixture layer 223 and the negative electrode mixture layer 243, respectively.

Particularly in a low-temperature environment at about −30° C., the rate determining factor for the reaction in which lithium ions are absorbed in and released from the positive electrode mixture layer 223 and the negative electrode mixture layer 243 during charge and discharge decreases considerably. This lithium-ion secondary battery 100 can suppress the deterioration of the output power characteristics particularly even in such a low-temperature environment. For this reason, the power supply system 2000 is suitable for a battery module (vehicle drive battery) 1000 incorporated in a vehicle 1 that is used in cold climate regions, as illustrated in FIG. 11.

Hereinabove, an example of the power supply system 2000 according to one embodiment of the present invention has been described, in which the secondary battery is the battery module 1000, in the power supply system 2000 according to the present invention, the secondary battery is not limited to the battery module 1000 but may be a single lithium-ion secondary battery 100. Moreover, the lithium-ion secondary battery 100 used in the power supply system 2000 may be any of various embodiments of the lithium-ion secondary battery 100 according to the present invention.

Hereinabove, the lithium-ion secondary battery 100 and the power supply system 2000 according to one embodiment of the present invention have been described. The lithium-ion secondary battery and the power supply system according to the present invention are not limited to any of the embodiments described above unless otherwise stated.

REFERENCE SIGNS LIST

1—Vehicle
61—Cooling plate
67—Connector
68, 69—End plate
71—Constraining belt
72—Screw
100—Lithium-ion secondary battery
200—Wound electrode assembly
220—Positive electrode sheet
221—Positive electrode current collector
222—Uncoated portion
222a—Intermediate portion
223—Positive electrode mixture layer
224—Positive electrode mixture
240—Negative electrode sheet
241—Negative electrode current collector
242—Uncoated portion
242a—Intermediate portion
243—Negative electrode mixture layer
244—Negative electrode mixture
245—Heat-resistant layer
262, 264—Separator
280—Electrolyte solution
290—Charger
300—Battery case 310—Gap
320—Case main body
322—Joint portion between lid and case main body
340—Lid
360—Safety vent
420—Positive electrode terminal (electrode terminal)
440—Negative electrode terminal (electrode terminal)
610—Positive electrode active material
620—Conductive material
630—Binder
710—Negative electrode active material
730—Binder
800—Evaluation test battery
810—Positive electrode sheet
820—Negative electrode sheet
830, 840—Separator
850—Wound electrode assembly
860—Outer case
870—Electrode terminal
1000—Battery module (vehicle drive battery)
2000—Power supply system
2100—Battery control unit

The invention claimed is:

1. A power supply system comprising:
a secondary battery; and
a battery control unit electrically connected to the secondary battery and configured to determine an upper limit value W of the amount of consumed electric charge per unit time during discharge of the secondary battery, wherein:
the secondary battery comprises:
a positive electrode current collector;
a positive electrode mixture layer, coated on the positive electrode current collector, and containing at least a positive electrode active material and a conductive material;
a negative electrode current collector;
a negative electrode mixture layer, coated on the negative electrode current collector, and containing at least a negative electrode active material; and
an electrolyte solution containing lithium ions at a predetermined concentration, wherein:
the positive electrode mixture layer has pores for impregnating the electrolyte solution;
the negative electrode mixture layer has pores for impregnating the electrolyte solution;
the number of lithium ions $X0$ in the electrolyte solution impregnated in the positive electrode mixture layer is obtained by the following equation:

$X0$=(the volumetric capacity $Vb$ (cm$^3$) of the pores in the positive electrode mixture layer)×(the lithium *ion* concentration $L$ (mol/L) of the electrolyte solution)×Avogadro's number (NA)×1/1000;

the number of lithium ions $Y0$ in the electrolyte solution impregnated in the negative electrode mixture layer is obtained by the following equation:

$Y0$=(the volumetric capacity $Vd$ (cm$^3$) of the pores in the negative electrode mixture layer)×(the lithium ion concentration $L$ (mol/L) of the electrolyte solution)×Avogadro's number (NA)×1/1000;

the upper limit value W of the amount of consumed electric charge is determined so as to correspond to a charge-discharge rate at which the number of lithium ions $X0$ or the number of lithium ions $Y0$ is consumed in one time of charging or discharging; and
the battery control unit controls charging or discharging under a condition in which the number of lithium ions $X0$ and the number of lithium ions $Y0$ are both equal to or greater than the number of consumed lithium ions Z in one time of charging or discharging.

2. The power supply system according to claim 1, wherein the upper limit value W of the amount of consumed electric charge is the amount of consumed electric charge at a time at which the one time of charging or discharging of the secondary battery is performed at a high rate of 20 C or higher.

3. The power supply system according to claim 1, wherein the number of lithium ions $Y1$ per unit weight of the negative electrode active material is $4.3 \times 10^{14}$ g$^{-1}$ or less.

4. The power supply system according to claim 1, wherein:
the secondary battery is a battery module comprising a plurality of lithium-ion secondary batteries; and
the number of consumed lithium ions Z is the total sum of the numbers of consumed lithium ions of the plurality of lithium-ion secondary batteries in the battery module.

5. The power supply system according to claim 1, wherein the positive electrode mixture layer has a density A1 of less than or equal to 1.9 g/cm$^3$.

6. The power supply system according to claim 1, wherein the positive electrode mixture layer has a bulk density A2 of less than or equal to 0.04 g/cm$^3$.

7. The power supply system according to claim 1, wherein the positive electrode mixture layer has a weight ratio A3 of the conductive material to the positive electrode of 11% or less.

* * * * *